(12) United States Patent
Oh et al.

(10) Patent No.: US 10,019,267 B2
(45) Date of Patent: Jul. 10, 2018

(54) METHOD AND APPARATUS FOR CONTROLLING UNLOCKING OF ELECTRONIC DEVICE BASED ON OPERATION MODE OF ANOTHER ELECTRONIC DEVICE

(71) Applicant: Samsung Electronics Co., Ltd., Gyeonggi-do (KR)

(72) Inventors: Hun-Cheol Oh, Seoul (KR);
Yong-Joon Jeon, Gyeonggi-do (KR);
Doo-Suk Kang, Gyeonggi-do (KR);
Seung-Nyun Kim, Incheon (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/569,334

(22) Filed: Dec. 12, 2014

(65) Prior Publication Data
US 2015/0169335 A1 Jun. 18, 2015

(30) Foreign Application Priority Data
Dec. 12, 2013 (KR) .................. 10-2013-0154724

(51) Int. Cl.
*G06F 3/00* (2006.01)
*G06F 13/12* (2006.01)
*G06F 13/38* (2006.01)
*G06F 9/4401* (2018.01)

(52) U.S. Cl.
CPC .......... *G06F 9/4411* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,987,454 B2 * | 1/2006 | Narayanaswami ... | G06F 1/3203 340/10.32 |
| 9,086,687 B2 * | 7/2015 | Park ...................... | G04G 21/04 |
| 9,621,562 B2 | 4/2017 | Furuichi et al. | |
| 2006/0224882 A1 | 10/2006 | Chin | |
| 2007/0149241 A1 * | 6/2007 | Gruber .................. | H04W 48/18 455/525 |
| 2009/0051649 A1 * | 2/2009 | Rondel .................... | G06F 1/163 345/156 |
| 2011/0195665 A1 | 8/2011 | Friedlaender | |
| 2011/0314539 A1 * | 12/2011 | Horton .................... | G06F 21/35 726/20 |
| 2012/0060128 A1 | 3/2012 | Miller et al. | |

(Continued)

FOREIGN PATENT DOCUMENTS

| KR | 10-1121586 | 3/2012 |
|---|---|---|
| KR | 10-1163709 | 7/2012 |
| KR | 10-2013-0032539 | 4/2013 |

OTHER PUBLICATIONS

Office Action dated Apr. 12, 2017 in U.S. Appl. No. 15/417,034.
Office Action dated Sep. 22, 2017 in U.S. Appl. No. 15/417,034.

*Primary Examiner* — David E Martinez
(74) *Attorney, Agent, or Firm* — Nixon & Vanderhye, P.C.

(57) ABSTRACT

Provided is a method for an electronic device. The method includes determining whether the electronic device is communicably connected to at least one of other electronic devices; and determining an operation mode of the electronic device depending on whether the electronic device is communicably connected to at least one of other electronic devices.

14 Claims, 21 Drawing Sheets

(56) References Cited

U.S. PATENT DOCUMENTS

| | | | |
|---|---|---|---|
| 2013/0297958 A1* | 11/2013 | Siegel | G06F 1/325 |
| | | | 713/323 |
| 2015/0031333 A1 | 1/2015 | Lee | |
| 2015/0082167 A1* | 3/2015 | Yeh | A61B 5/4815 |
| | | | 715/716 |
| 2016/0277891 A1 | 9/2016 | Dvortsov et al. | |

* cited by examiner

METHOD AND APPARATUS FOR CONTROLLING UNLOCKING OF ELECTRONIC DEVICE BASED ON OPERATION MODE OF ANOTHER ELECTRONIC DEVICE

PRIORITY

The present application is related to and claims priority under 35 U.S.C. § 119 to an application filed in the Korean Intellectual Property Office on Dec. 12, 2013 and assigned Serial No. 10-2013-0154724, the contents of which are incorporated herein by reference.

TECHNICAL FIELD

Embodiments of the present disclosure relate to a method and apparatus for sharing information associated with operations in a plurality of electronic devices.

BACKGROUND

With the development of information communication technology and semiconductor technology, various types of electronic devices have been developed into devices for providing various multimedia services. For example, the electronic devices have provided various services, such as a messenger servicer, a broadcast service, a wireless Internet service, a camera service and a music playback service.

With the development of information communication technology, the electronic devices are capable of being connected to one another by wire or wirelessly to transmit and receive a variety of information.

When the electronic devices are connected to one another by wire or wirelessly, there is inconvenience that a user selects or inputs settings of an electronic device separately with respect to the electronic devices.

Furthermore, since the respective electronic devices include setting information set or input by the user, it is difficult to automatically change the setting information of the electronic devices so as to be suitable for service characteristics or use environment. Therefore, it is inconvenient for the user to change the setting information of the respective electronic devices so as to correspond to the setting information of the electronic devices according to service characteristics or use environment.

SUMMARY

Embodiments of the present disclosure provide a method and apparatus for controlling an operation state of at least one of other electronic devices connected to an electronic device based on operation information or use information of the electronic device.

According to an aspect of the present disclosure, a method for operating an electronic device includes determining whether the electronic device is communicably connected to at least one of other electronic devices; and determining an operation mode of the electronic device depending on whether the electronic device is communicably connected to at least one of other electronic devices.

The method may further include changing a security mode of the electronic device when the electronic device is communicably connected to the other electronic device, and the security mode may include one or more of an authentication method, a number of times of authentication, and identity data.

The method may further include changing a time point at which the electronic device switches to a deactivated mode when the electronic device is communicably connected to the other electronic device.

The determining of the operation mode of the electronic device includes, when the electronic device is communicably connected to another electronic device, determining the operation mode of the electronic device based on characteristics of an application program which is being executed in the other electronic device.

According to another aspect of the present disclosure, an electronic device includes a communication unit; and a processor for determining whether the electronic device is communicably connected to at least one of other electronic devices through the communication unit and determining an operation mode of the electronic device.

The processor may change a security mode of the electronic device when the electronic device is communicably connected to another electronic device through the communication unit, and the security mode may include one or more of an authentication method, a number of times of authentication, and identity data.

The processor may change a time point at which the electronic device switches to a deactivated mode when the electronic device is communicably connected to the other electronic device through the communication module.

When the electronic device is communicably connected to another electronic device, the processor may determine the operation mode of the electronic device based on characteristics of an application program which is being executed in the other electronic device when the electronic device is communicably connected to another electronic device.

According to another aspect of the present disclosure, a computer-readable storage medium stores a program which causes a computer to determine whether the electronic device is communicably connected to at least one of other electronic devices; and determine an operation mode of the electronic device depending on whether the electronic device is communicably connected to at least one of other electronic devices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, exemplary embodiments of the present disclosure will be described below in detail with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure provides a technique for performing interworking of operation modes with one or more other electronic devices in an electronic device.

Examples of the electronic device according to the present disclosure may include one or more of a smart phone, a tablet personal computer, a mobile phone, a video phone, an e-book reader, a desktop personal computer, a laptop personal computer, a personal digital assistant, a portable multimedia player, a MP3 player, an accessory, an appcessory, a camera, a wearable device, a wrist watch, a refrigerator, an air-conditioner, a cleaner, an intelligent robot, a television (TV), a digital video disk (DVD) player, an audio system, an oven, a microwave oven, a washing machine, an electronic bracelet, an electronic necklace, an air cleaner, or a digital photo frame, a medical device, a navigation device, a global positioning system (GPS) receiver, an event data recorder (EDR), a flight data recorder (FDR), a set-top box, a TV box, an electronic dictionary, a vehicle infotainment device, an electronic equipment for ships, an avionics, a security device, an electronic clothing, an electronic key, a camcorder, a game console, a HMD (Head-Mounted Display), a flat panel display device, an electronic album, a furniture or a portion of a building/structure including an electronic device, an electronic board, an electronic signature receiving device, and a protector. It is obvious to those skilled in the art that the electronic device according to the present disclosure is not limited to the above-described devices.

Figure 1:
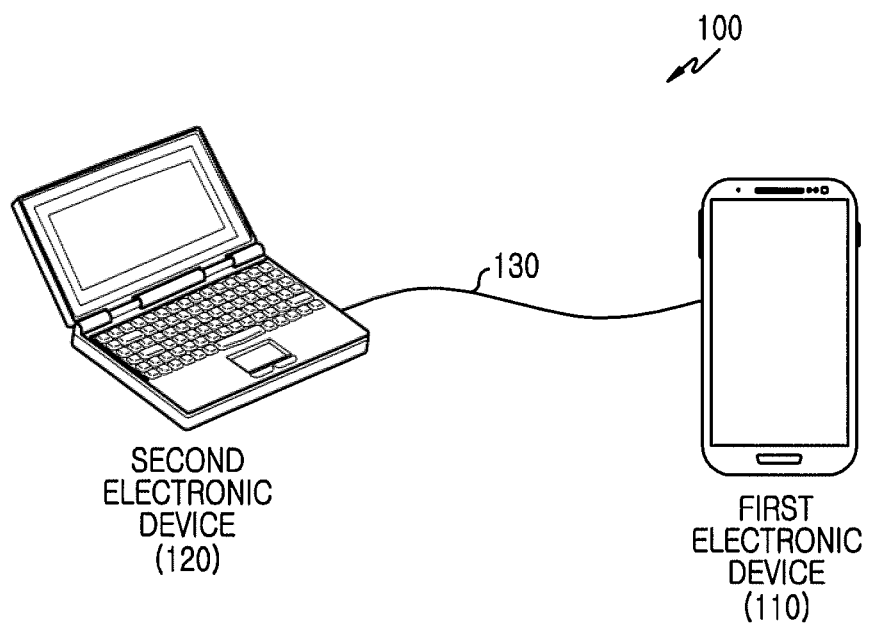
FIG. 1 illustrates a configuration for connecting to another electronic device through a wired link in an electronic device according to an embodiment of the present disclosure.

FIG. 1 illustrates a configuration for connecting to another electronic device through a wired link in an electronic device according to an embodiment of the present disclosure.

Referring to FIG. 1, a first electronic device 110 may establish a communication link with a second electronic device 120 by using a wired link 130. For example, the first electronic device 110 may establish a communication link with the second electronic device 120 by using a universal serial bus (USB). For example, the first electronic device 110 may establish a communication link with the second electronic device 120 by using a docking device connected to the second electronic device 120.

Figure 2:
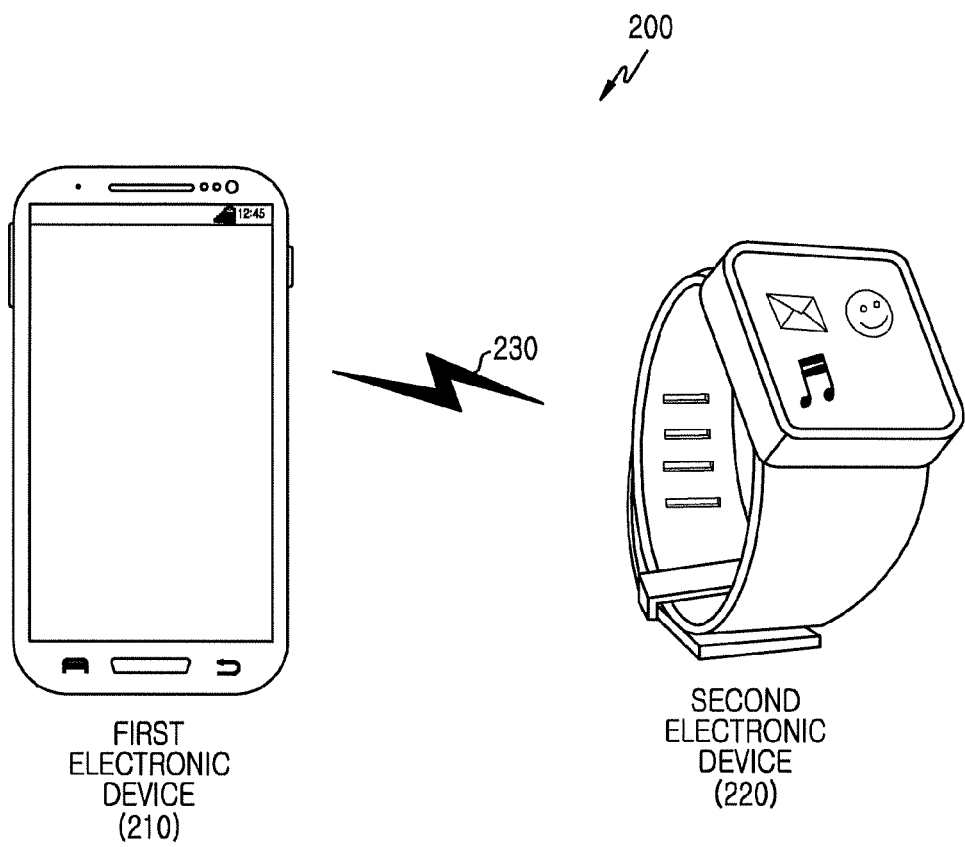
FIG. 2 illustrates a state in which an electronic device is connected to another electronic device through a wireless link according to an embodiment of the present disclosure.

FIG. 2 illustrates a configuration for connecting to another electronic device through a wireless link in an electronic device according to an embodiment of the present disclosure.

Referring to FIG. 2, the first electronic device 210 may establish a communication link with the second electronic device 220 by using a wireless link 230. For example, the first electronic device 210 may establish a communication link with the second electronic device 220 by using a short-range communication scheme. For example, the second electronic device 220 may include a wearable electronic device. The short-range communication scheme may include one or more of wireless local area network (WLAN) communication, Bluetooth communication, near filed communication.

When the first electronic device 110 or 210 is connected to the second electronic device 120 or 220 by wired or wirelessly, the first electronic device 110 or 210 and the second electronic device 120 or 220 may share operation information with another electronic device to perform interworking of operation modes. For example, the operation mode includes a deactivated mode of the electronic device, such as a screensaver mode, a power saving mode, or a locked mode, and an activated mode of the electronic device, such as a standby mode or a service mode. For example, the operation mode may include one or more of functions capable of being executed in the electronic device, methods for executing the functions, and operational states of the functions. The standby mode refers to a state in which an application program for a specific service is not executed in the electronic device and may include a state in which a reference screen (for example, home screen) is displayed. The service mode may include a state in which an application program for a specific service is being executed.

Figure 3:
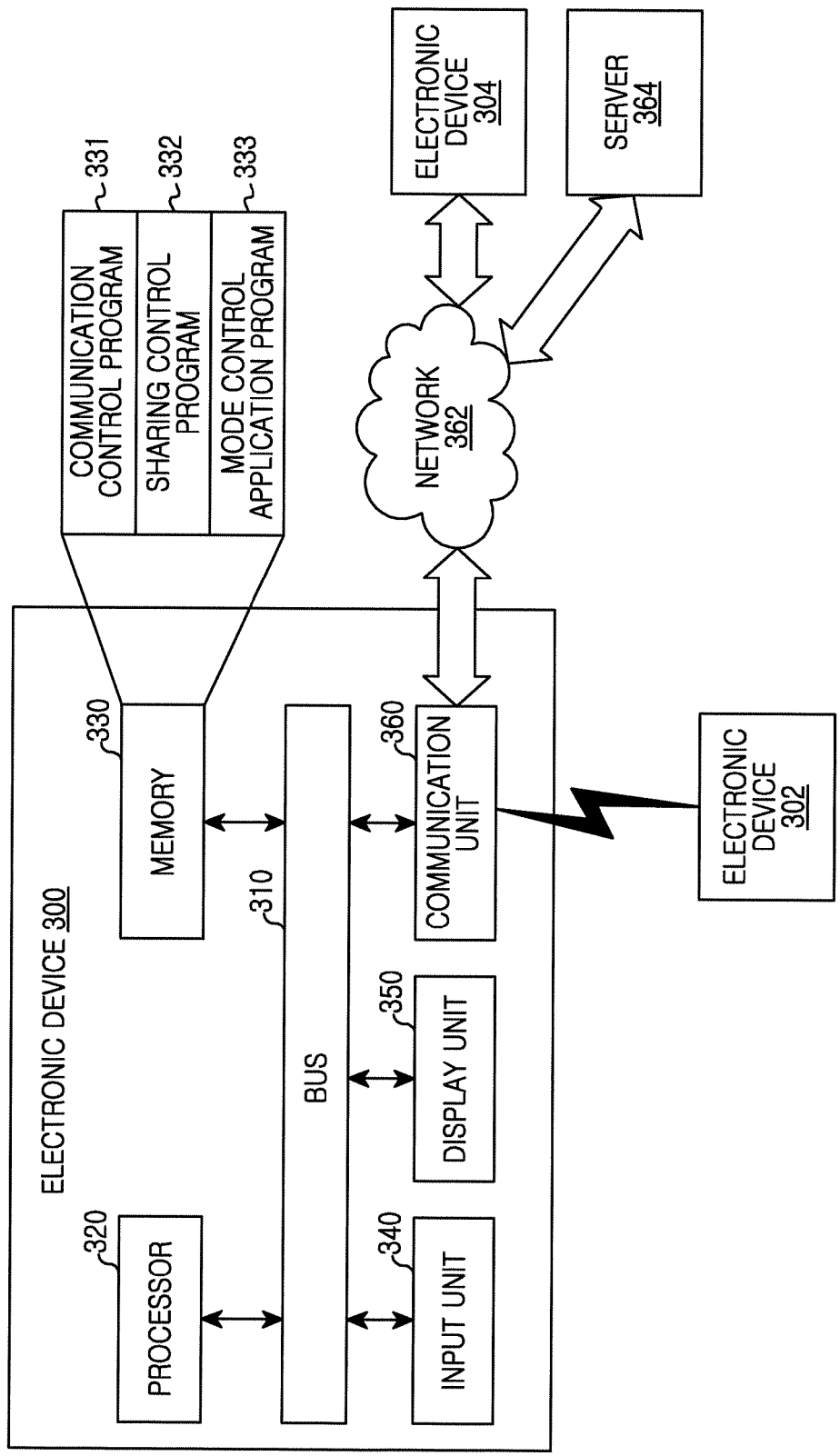
FIG. 3 is a block diagram illustrating an electronic device according to an embodiment of the present disclosure.

FIG. 3 is a block diagram illustrating an electronic device according to an embodiment of the present disclosure. In the following description, the electronic device 300 may include the first electronic device 110 or 210 and the second electronic device 120 or 220 illustrated in FIGS. 1 and 2.

Referring to FIG. 3, the electronic device 300 may include a bus 310, a processor 320, a memory 330, an input unit 340, a display unit 350, and a communication unit 360. For example, at least one of the memory 330 and the processor 320 may be plural.

The bus 310 may connect components included in the electronic device 300 to one another and transfer information (for example, control message) which is transmitted and received between the components included in the electronic device 300.

The processor 320 may perform control such that the electronic device 300 provides various services. For example, the processor 320 may decode a command received from one or more other components (for example, the memory 330, the input unit 340, the display unit 350, or the communication unit 360) included in the electronic device 300 through the bus 310 and perform arithmetic operations or data processing according to the decoded command.

The processor 320 may perform control such that the electronic device 300 provides various services, by executing one or more programs stored in the memory 330.

The processor 320 may execute a sharing control program 332 stored in the memory 330, and therefore, share operation state information of the electronic device 300 with one or more other electronic devices (for example, an electronic device 302 or 304 or a server 364) with which the communication link is established through the communication unit 360. For example, when the electronic device 300 establishes a communication link with another electronic device, the processor 320 may transmit the operation state information of the electronic device 300 to the other electronic device. In this case, the operation state information may include one of activated state information of the electronic device 300, deactivated state information of the electronic device 300, and information related to an application program which is executed in the electronic device 300. The other electronic device may be of the same type as or a different type from the electronic device 300.

For example, when the electronic device 300 switches between operation modes, the processor 320 may transmit the operation state information of the electronic device 300 to the other electronic device with which the communication link is established.

For example, the processor 320 may control operation state of the other electronic device according to the operation state of the electronic device 300. For example, when the electronic device 300 operates in a deactivated mode, the processor 320 may transmit a signal for requesting a switching to a deactivated state to the other electronic device through the communication unit 160. When the electronic device 300 operates in an activated mode, the processor 320 may transmit a signal for requesting a switching to an activated state to the other electronic device through the communication unit 160. The processor 320 may determine an operation mode of the other electronic device according to characteristics of the application program executed in the electronic device 300 and transmit information on the determined operation mode to the other electronic device.

Figure 7A:
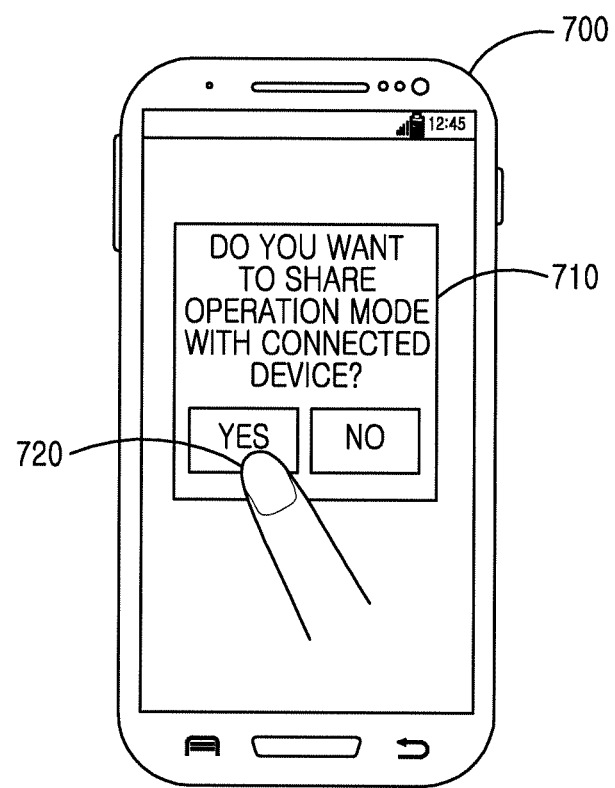
FIGS. 7A to 7B illustrates screen configurations for setting interworking of operation modes in an electronic device according to an embodiment of the present disclosure.
Figure 7B:
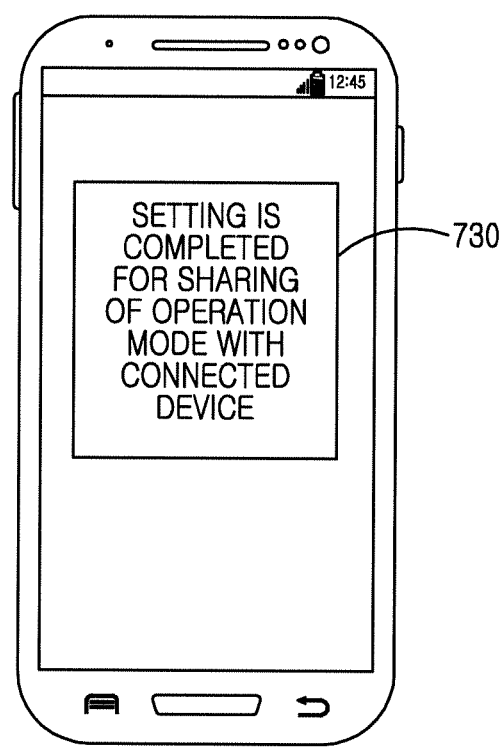

The processor 320 may determine whether to share the operation state information of the electronic device with the other electronic device with which the communication link is established through the communication unit 360 by executing the sharing control program 332 stored in the memory 330. For example, when the electronic device 300 establishes the communication link with the other electronic device, the processor 320 may control the display unit 350 such that the display unit 350 displays notification information 710 for determining whether to share an operation mode as illustrated in FIG. 7A. The processor 320 may determine whether to share operation state information with the other electronic device according to user input information provided through the notification information 710. For example, in the case of sharing the operation state information with the other electronic device, the processor 320 may control the display unit 350 such that the display unit 350 displays sharing setting message 730 as illustrated in FIG. 7B.

For example, when the electronic device 300 establishes a communication link with another electronic device, the processor 320 may determine whether to share the operation state information with the other electronic device depending on a distance between the electronic device 300 and the other electronic device. For example, when the distance between the electronic device 300 and the other electronic device is shorter than a reference distance, the processor 320 may determine that the electronic device 300 shares the operation state information with the other electronic device.

The processor 320 may control an operation mode of the electronic device 300 by executing a mode control program 333 stored in the memory 330. For example, when the electronic device 300 that operates in a deactivated mode establishes a communication link with another electronic device by using a wireless link or a wired link, the processor 320 may switch the electronic device 300 to an activated mode.

For example, when the electronic device 300 that operates in a deactivated mode establishes a communication link with another electronic device by using a wireless link, the processor 320 may switch the electronic device 300 to an activated mode selectively depending on a distance between the electronic device 300 and the other electronic device. For example, when it is determined to share the operation state information with the other electronic device by using the sharing control program 332, the processor 320 may switch the electronic device 300 to an activated mode. Also, when the distance between the electronic device 300 and the other electronic device is in a specified range, the processor 320 may switch the electronic device 300 to an activated mode.

For example, when receiving operation state information from another electronic device with which the communication link is established, the processor 320 may determine an operation mode of the electronic device 300 based on the operation state information of the other electronic device. For example, when the other electronic device is deactivated, the processor 320 may determine that the electronic device 300 operates in a deactivated mode. When the other electronic device is activated, the processor 320 may determine that the electronic device 300 operates in an activated mode. The processor 320 may determine in which mode of the activated mode and the deactivated mode the electronic device 300 operates, depending on characteristics of an application program executed in the other electronic device.

For example, the processor 320 may change a deactivated-mode control variable of the electronic device 300 depending on whether the electronic device 300 is connected to another electronic device through the communication link. For example, the deactivated-mode control variable may include a time point at which a switching to the deactivated mode is performed.

For example, the processor 320 may change a security mode of the electronic device 300 depending on whether the electronic device 300 is connected to another electronic device through the communication link. For example, the processor 320 may change one or more of an authentication method, the number of times of authentication, and identity data depending on whether the electronic device 300 is connected to another electronic device through the communication link. For example, the identity data may include one or more of a password, a lock pattern, and a biometric identifier.

The memory 330 may store a command or data received from or generated by one or more components (the processor 320, the input unit 340, the display unit 350, and the communication unit 360) included in the electronic device 300.

The memory 330 may store one or more programs for services of the electronic device 300. For example, the memory 330 may include one or more of a communication control program 331, the sharing control program 332, and the mode control application program 333.

The communication control program 331 may include at least one software component for communicating with another electronic device through the communication unit 360.

The sharing control program 332 may include at least one software component for sharing operation state information of the electronic device 300 with another electronic device with which the communication link is established through the communication unit 360.

The mode control program 333 may include at least one software component for controlling an operation mode of the electronic device 300. For example, the mode control program 333 may determine an operation mode of the electronic device 300 depending on whether the electronic device 300 is connected to another electronic device the communication link. As another example, the mode control program 333 may determine an operation mode of the electronic device 300 based on operation state information of another electronic device to which the electronic device 300 is connected through the communication link.

At least one of the communication control program 331, and the sharing control program 332, and the mode control program 333 may be implemented by using software, firmware, or a hardware (for example, circuits or circuitry). Also, at least one of the communication control program 331, and the sharing control program 332, and the mode control program 333 may be included in the electronic device 300 as a separate component and may be included in another component.

The input unit 340 may detect an instruction or data which is input by the user. For example, the input unit 340 may transmit an instruction or data which is input by the user to the processor 320 or the memory 330 through the bus 310. For example, the input unit 340 may include at least one of a keypad including at least one hardware button and a touch panel for detecting touch information.

The display unit 350 may display a still image, a moving image, or data to the user. For example, the display unit 350 may display information about application programs executed by the processor 320.

The communication unit 360 may communicably connect the electronic device 300 to at least one device 302 or 304, the server 364, or one or more peripheral devices. For example, the communication unit 360 may support short-range communication protocols (for example, wireless local area network (WLAN), Bluetooth, or near-field communication (NFC)), network communication protocols (for example, Internet, local area network (LAN), wire area network (WAN), telecommunication network, cellular network, satellite network or plain old telephone service (POTS)), or wire communication protocols (for example, universal serial bus (USB) or high definition multimedia interface (HDMI)). For example, the communication protocol (for example, short-range communication protocol, network communication protocol, or wire communication protocol) may be supported by the middleware of the memory 330 and an application programming interface (API).

In the above-described embodiment, the processor 320 may share operation state information of the electronic device 300 with another electronic device or determine an operation mode of the electronic device 300 by executing software components stored in the memory 330 in a single module.

Figure 4:
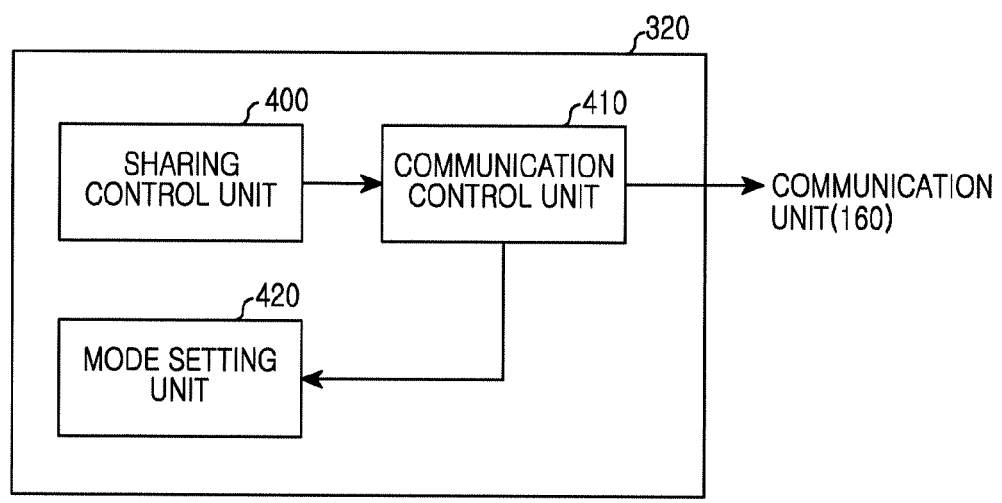
FIG. 4 illustrates a detailed block diagram of a processor according to an embodiment of the present disclosure.

In another embodiment, the processor 320 may include components for sharing operation state information of the electronic device 300 with another electronic device and determining an operation mode of the electronic device 300 as separate modules, as illustrated in FIG. 4.

FIG. 4 illustrates a detailed block diagram of a processor according to an embodiment of the present disclosure.

Referring to FIG. 4, the processor 320 may include a sharing control unit 400, a communication control unit 410, and a mode setting unit 420.

The sharing control unit 400 may determine whether to share operation state information of the electronic device 300 with one or more other electronic devices with which the communication link is established through the communication unit 360. For example, the sharing control unit 400 may determine whether to share the operation state information of the electronic device with the other electronic device with which the communication link is established by executing the sharing control program 332 stored in the memory 330.

For example, when the electronic device 300 establishes the communication link with the other electronic device, the sharing control unit 400 may perform control to display notification information 710 for determining whether to share an operation mode in the display unit 350 as illustrated in FIG. 7A. The sharing control unit 400 may determine whether to share operation state information with the other electronic device according to user input information provided through the notification information 710.

For example, when the electronic device 300 establishes a communication link with another electronic device, the sharing control unit 400 may determine whether to share the operation state information with the other electronic device depending on a distance between the electronic device 300 and the other electronic device. For example, when the distance between the electronic device 300 and the other electronic device is shorter than a reference distance, the sharing control unit 400 may determine that the electronic device 300 shares the operation state information with the other electronic device.

When it is determined to share the operation state information with the other electronic device, the sharing control unit 400 may share the operation state information of the electronic device 300 with another electronic device with which the communication link is established through the communication unit 360. For example, the sharing control unit 400 may share the operation state information of the electronic device with the other electronic device connected with which the communication link is established through the communication unit 360 by executing the sharing control program 332 stored in the memory 330.

For example, when the electronic device 300 establishes a communication link with another electronic device, the sharing control unit 400 may transmit the operation state information of the electronic device 300 to the other electronic device.

For example, when the electronic device 300 switches between operation modes, the sharing control unit 400 may transmit the operation state information of the electronic device 300 to the other electronic device with which the communication line is established.

For example, the sharing control unit 400 may control operation state of the other electronic device according to the operation state of the electronic device 300. For example, when the electronic device 300 operates in an inactive mode, the sharing control unit 400 may transmit a signal for requesting a switching to an inactive state to the other electronic device through the communication unit 160. When the electronic device 300 operates in an active mode, the sharing control unit 400 may transmit a signal for requesting a switching to an active state to the other electronic device through the communication unit 160. The sharing control unit 400 may determine an operation mode of the other electronic device according to characteristics of the application program executed in the electronic device 300 and transmit information on the determined operation mode to the other electronic device.

The mode setting unit 420 may control an operation mode of the electronic device 300. The mode setting unit 420 may control an operation mode of the electronic device 300 by executing a mode control program 333 stored in the memory 330.

For example, when the electronic device 300 that operates in a deactivated mode establishes a communication link with another electronic device by using a wireless link or a wired link, the mode setting unit 420 may switch the electronic device 300 to an activated mode.

For example, when the electronic device 300 that operates in a deactivated mode establishes a communication link with another electronic device by using a wireless link, the mode setting unit 420 may switch the electronic device 300 to an activated mode selectively depending on a distance between the electronic device 300 and the other electronic device. For example, when it is determined to share the operation state information with the other electronic device in the sharing control unit 400, the mode setting unit 420 may switch the electronic device 300 to an activated mode. Also, when the distance between the electronic device 300 and the other electronic device is in a specified range, the mode setting unit 420 may switch the electronic device 300 to an activated mode.

For example, when operation state information is received from another electronic device with which the communication link is established, the mode setting unit 420 may determine an operation mode of the electronic device 300 based on the operation state information of the other electronic device. For example, the mode setting unit 420 may determine in which mode of the activated mode and the deactivated mode the electronic device 300 operates, depending on characteristics of an application program executed in the other electronic device.

For example, the mode setting unit 420 may change a deactivated-mode control variable of the electronic device 300 depending on whether the electronic device 300 is connected to the other electronic device through a communication link. The deactivated-mode control variable may include a time point at which a switching to the deactivated mode is performed.

For example, the mode setting unit 420 may change a security mode of the electronic device 300 depending on whether the electronic device 300 is connected to another electronic device through a communication link. For example, the mode setting unit 420 may change one or more of an authentication method, the number of times of authentication, and identity data depending on whether the electronic device 300 is connected to another electronic device through a communication link.

In the above-described embodiment, the electronic device may use the processor 320 to share operation state information of the electronic device 300 with another electronic device, or determine an operation mode of the electronic device 300.

In another embodiment, the electronic device may include a separate module for sharing operation state information of the electronic device 300 with another electronic device, or determining an operation mode of the electronic device 300.

Figure 5:
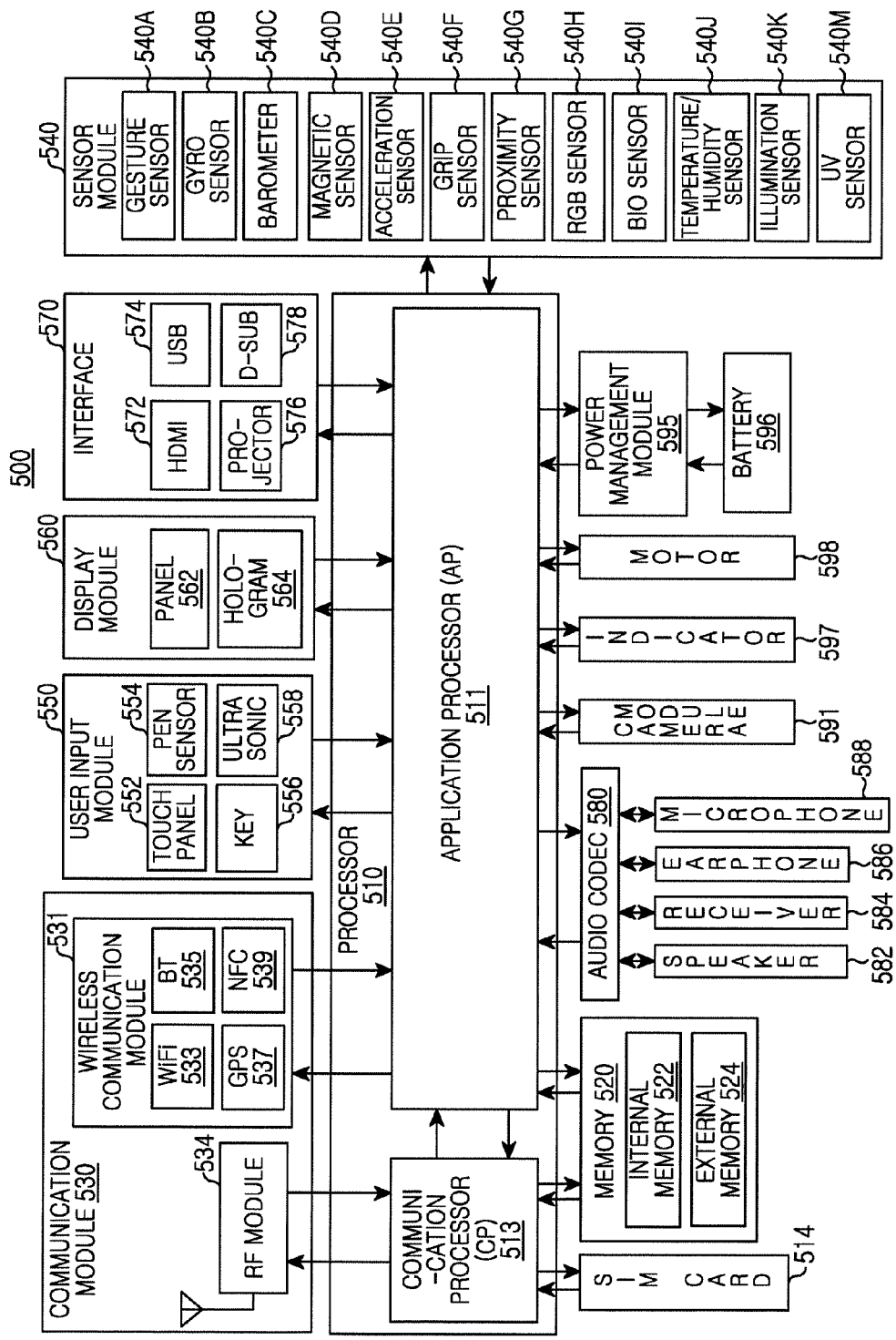
FIG. 5 illustrates a detailed block diagram of an electronic device according to an embodiment of the present disclosure.

FIG. 5 illustrates a detailed block diagram of an electronic device according to an embodiment of the present disclosure. In the following description, the electronic device 500 may include the whole or partial configuration of the electronic device 300 illustrated in FIG. 3.

Referring to FIG. 5, the electronic device 500 may include at least one processor 510, a subscriber identification module (SIM) card 514, a memory 520, a communication module 530, a sensor module 540, an input module 550, a display 560, an interface 570, an audio module 580, a camera module 591, a power management module 595, a battery 596, an indicator 597, and a motor 598.

The processor 510 may include at least one application processor (AP) 511 or at least one communication processor (CP) 513. For example, the processor 510 may include the processor 320 illustrated in FIG. 3. For example, the AP 511 and the CP 513 may be included in one processor 510 as illustrated in FIG. 5, or may be respectively included in different integrated chip (IC) packages. The processor 510 may further include a graphics processing unit (GPU) (not illustrated).

The AP 511 may execute an operating system and an application program to control a plurality of hardware or software components which are connected to the AP 511 and perform data processing and data operations on various types of data including multimedia data. For example, the AP 511 may be implemented by using, for example, a system on chip (SoC).

The CP 513 may perform a function of managing data links and transforming communication protocols upon communication between the electronic device 500 (for example, the electronic device 300 of FIG. 3) and other electronic devices (for example, the electronic device 302, the electronic device 304, or the server 364 in the FIG. 3) connected the electronic device 500 through a network. For example, the CP 513 may be implemented by, for example, an SoC.

The CP 513 may perform at least one of multimedia control functions. For example, the CP 513 may perform identification and authentication for electronic devices in a communication network by using, for example, a subscriber identification module (for example, the SIM card 514). As another example, the CP 513 may provide a user with services, such as a voice call, a video call, a short message service (SMS) message, or packet data.

In addition, the CP 513 may control data transmission and reception of the communication module 530.

The SIM card 514 may be a card including a subscriber identity module or may be inserted into a slot formed in a specific position of the electronic device 500. For example, the SIM card 514 may include unique identification information (for example, integrated circuit card identifier (IC-CID)) or subscriber information (for example, international mobile subscriber identity (IMSI)).

The memory 520 may include an internal memory 522 or an external memory 525.

The internal memory 522 may include one or more of a volatile memory (for example, DRAM (dynamic RAM), SRAM (static RAM), or SDRAM (synchronous dynamic RAM)) and a non-volatile memory (for example, OTPROM (one time programmable ROM), PROM (programmable ROM), EPROM (erasable and programmable ROM), EEPROM (electrically erasable and programmable ROM), mask ROM, flash ROM, NAND flash memory, or NOR flash memory). The internal memory 522 may be a solid state drive (SSD).

The AP 511 or the CP 513 may load a command or data, which is received from at least one of a nonvolatile memory and another component connected to the AP 111 or the CP 113, into a volatile memory and process the same. The AP 511 or the CP 513 may store data received from or generated by at least one of other components in the nonvolatile memory.

The external memory 525 may be an external memory such as a Compact Flash (CF), a Secure Digital (SD), a Micro-Secure Digital (Micro-SD), a Mini-SecureDigital (Mini-SD), an Extreme Digital (xD), a memory stick, etc. The external memory 525 may be functionally connected to the electronic device 500 through various interfaces. According to an embodiment, the electronic device 500 may further include a storage (or storage medium), such as a hard drive.

The communication module 530 may include at least one of a wireless communication module 531 and a radio frequency (RF) module 535.

The wireless communication module 531 may include a WiFi module 533, a Bluetooth module 535, a global positioning system (GPS) module 537, and a near-field communication module 539. For example, the wireless communication module 531 may provide a wireless communication function by using a radio frequency. In addition, the wireless communication module 531 may include a network interface (for example, LAN card) or a modem which connects the electronic device 500 to a network (for example, Internet, LAN, WAN, telecommunication network, cellular network, satellite network, or POTS).

The RF module 534 may perform transmission and reception of data, for example, transmission and reception of RF signals. For example, the RF module 534 may include a transceiver, a power amplifier module (PAM), a frequency filter, a low noise amplifier (LNA), or the like. The RF module 534 may further include a component for transmitting and receiving electromagnetic waves in free space for wireless communication, for example, a conductor or a conductive line.

The sensor module 540 may measure a physical amount or detect the operating state of the electronic device and convert measured or detected information into electrical signals. For example, the sensor module 540 may include at least one of, for example, a gesture sensor 540-A, a gyro sensor 540-B, a barometer 540-C, a magnetic sensor 540-D, an acceleration sensor 540-E, a grip sensor 540-F, a proximity sensor 540-G, a RGB (red-green-blue) sensor 540-H, a biometric sensor 540-I, a temperature/humidity sensor 540-J, an illumination sensor 540-K, and an ultra violet (UV) sensor 540-M. In addition to the components illustrated in FIG. 5, the sensor module 540 may further include at least one of an E-nose sensor (not illustrated), electromyography (EMG) sensor (not illustrated), an electroencephalogram (EEG) sensor (not illustrated), an electroencephalogram (ECG) sensor (not illustrated), an infrared (IR) sensor, an iris sensor (not illustrated), and a fingerprint sensor. The sensor module 540 may further include a control circuit for controlling one or more sensors included in the sensor module 540.

The input module 550 may include a touch panel 552, a pen sensor 554, a key 556, or an ultrasonic input device 558.

The touch panel 552 may recognize a touch input by using at least one of a capacitive method, a resistive method, an infrared method, and an ultrasonic method. In the case of using the capacitive method, physical contact or proximity recognition is possible in the touch panel 552. The touch panel 552 may further include a control circuit. The touch panel 552 may further include a tactile layer to provide a tactile effect to a user.

The pen sensor 554 may be implemented according to the same as or similar to a method of receiving the user's touch input, or by using a separate recognition sheet.

The key 556 may include a physical button, an optical key, or a touch key.

The ultrasonic input device 588 detects sound wave and identifies data and allows for wireless recognition.

In addition, the electronic device 500 may receive a user input from an external device (for example, network, computer or server) through the communication module 530.

The display 560 may include a panel 562, a hologram 564 and a projector 566.

The panel 562 may include a liquid crystal display (LCD) panel or an active-matrix organic light-emitting diode (AM-OLED) panel. The panel 562 may be implemented to flexible, transparent or wearable. The panel 562 and the touch panel 552 may be formed as one module.

The hologram 564 may enable a three-dimensional image to be viewed in space using optical interference.

The projector 566 may project light onto a screen to display an image. For example, the screen may be disposed inside or outside the electronic device 500.

In addition, the display module 560 may further include a control circuit for controlling at least one of the panel 562, the hologram 564, and the projector 566.

The interface 570 may include a high-definition multimedia interface (HDMI) 572, a universal serial bus (USB) 574, an optical interface 576, and a D-subminiature (D-sub) 578. Additionally, or alternatively, the interface 570 may further include at least one of SD (secure Digital)/MMC (multimedia card) (not illustrated), IrDA (infrared data association) (not illustrated), and MHL (mobile high-definition link (not illustrated)).

The audio module 580 may perform conversion between sound and an electric signal bi-directionally. For example, at least one component of the audio module 580 may be included in the electronic device 300 illustrated in FIG. 3. For example, the audio module 580 may process sound information input or output through input and output devices, such as a speaker 582, a receiver 584, an earphone 586, and a microphone 588.

The camera module 591 may capture a still image and a moving image. For example, the camera module 591 may include one or more of one or more image sensors (for example, a front sensor or a rear sensor), a lens (not illustrated), an image signal processor (ISP) and a flash (not illustrated) (for example, LED or Xenon lamp).

The power management module 595 may manage power of the electronic device 500. For example, the power management module 595 may include a power management integrated circuit (PMIC), a charger integrated circuit (charger IC), or a battery fuel gauge (or a fuel gauge). The PMIC may be mounted within an integrated circuit or an SoC semiconductor. The charger IC may charge the battery 596 and prevent an overvoltage or an overcurrent from being applied from a charger. The charger IC may include a charger IC for at least one of a wired charging method or a wireless charging method. The wireless charging method may include a magnetic resonance method, a magnetic induction method, or an electromagnetic wave method.

The battery gage may measure a remaining power of the battery 596, or a voltage, a current, or a temperature during charging.

The battery 596 may store and generate electricity, and supply power to the electronic device 500 using the stored or generated electricity. The battery 596 may include a rechargeable battery or a solar battery.

The indicator 507 may indicate state information of the electronic device 500 or a component (for example, the AP 511) included in the electronic device 500. For example, the indicator 597 may display a booting state, a message state, a charging state, or the like.

The motor 598 may convert electrical signals into mechanical vibration.

Although not illustrated, the electronic device 500 may include a processing device (for example, a graphics processing unit (GPU)) for supporting a mobile TV service. For example, the processing device for supporting a mobile TV service may process media data compliant with a standard, such as digital multimedia broadcasting (DMB), digital video broadcasting (DVB), or media flow.

The names of the above-described components of the electronic device 500 according to the embodiment of the present disclosure may be changed according to the type of the electronic device 500. Also, the electronic device 500 may include or exclude one or more of components of the above-described components depending on the type of the electronic device 500 or may further include other additional components.

In the above-described embodiment, the electronic device 500 may include the CP 513, the power management module 595, and the memory 520 as components that are separate from the AP 511.

In the other embodiment, the electronic device 500 may be implemented such that the AP 511 includes at least one of the CP 513, the power management module 595, and the memory 520.

Figure 6:
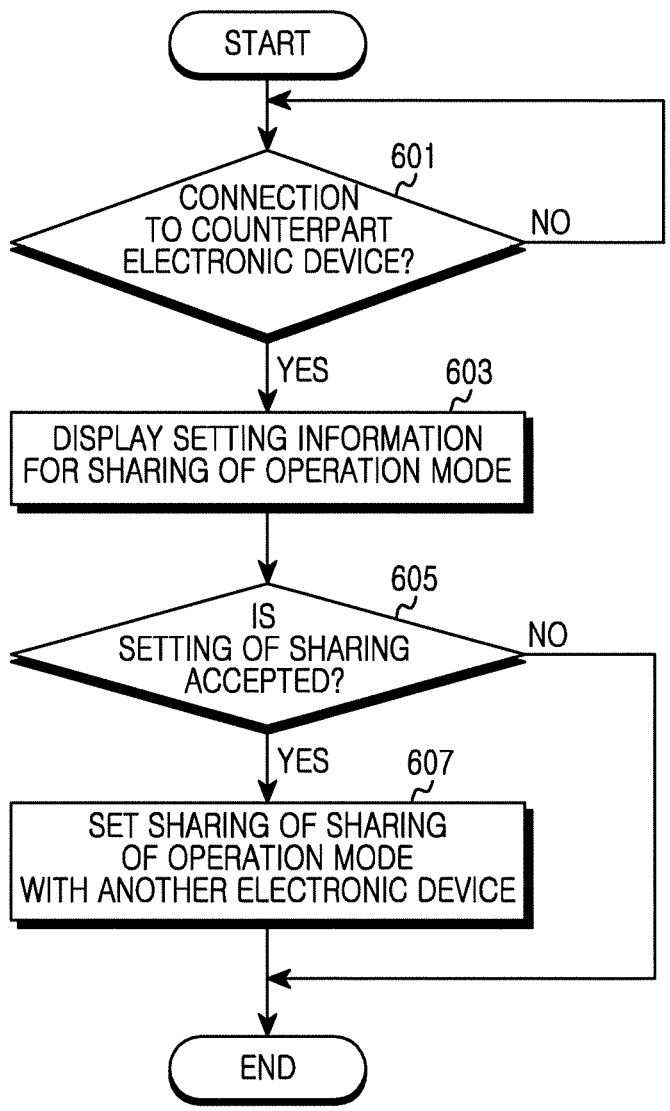
FIG. 6 illustrates a process for setting interworking of operation modes in an electronic device according to an embodiment of the present disclosure.

FIG. 6 illustrates a process for setting interworking of operation modes in an electronic device according to an embodiment of the present disclosure. FIGS. 7A to 7B illustrates screen configurations for setting interworking of operation modes in an electronic device according to an embodiment of the present disclosure.

Referring to FIG. 6, in step 601, the electronic device (for example, the electronic device 300 of FIG. 3) determines whether the electronic device is connected to another electronic device (for example, the electronic device 302 or 304 of FIG. 3 or the server 364) through a communication link. For example, the communication link may include at least one of a wireless link and a wired link.

When being connected to another electronic device through the communication link, the electronic device may display setting information for sharing of an operation mode on the display unit 350 in step 603. For example, when the electronic device 700 establishes a communication link with another electronic device in FIG. 7A, the electronic device 700 may determine whether the other electronic device is authenticated. When the other electronic device is authenticated, the electronic device 700 may display notification information 710 for determining whether to share an operation mode on the display unit 350. When the other electronic device is not authenticated, the electronic device 700 may perform an authentication process with the other electronic device.

In step 605, the electronic device may determine whether a user accepts setting of sharing. For example, the electronic device 700 may determine whether "YES" 720 is selected in the notification information 710 for determining whether to share an operation mode in FIG. 7A.

When the user does not accept setting of sharing, the electronic device may recognize that there is no interworking of operation modes with the other electronic device with which the communication link is established. For example, when "NO" 710 is selected in the notification information 710 for determining whether to share an operation mode in FIG. 7A, the electronic device may recognize that there is no interworking of operation modes with the other electronic device with which the communication link is established. As another example, when input information is not detected for a reference period of time after display of the notification information 710 for determining whether to share an operation mode in FIG. 7A, the electronic device may recognize that there is no interworking of operation modes with the other electronic device with which the communication link is established.

When the setting of sharing is accepted in step 605, the electronic device may set interworking of operation modes with the other electronic device with which the communication link is established in step 607. For example, when "YES" 720 is selected in the notification information 710 for determining whether to share an operation mode in FIG. 7A, the electronic device may recognize that there is interworking of operation modes with the other electronic device with which the communication link is established. In this case, the electronic device is capable of performing interworking of operation modes with an another electronic device as illustrated in FIGS. 8 to 20.

Figure 8:
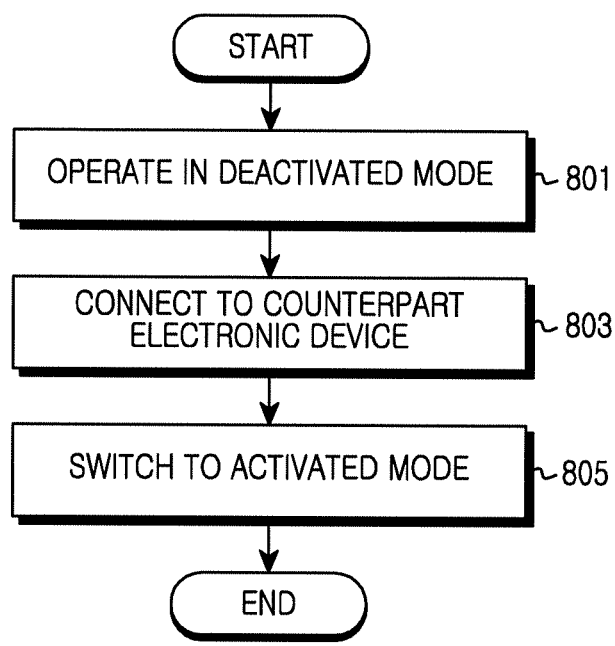
FIG. 8 illustrates a flowchart of a process for switching to an activated mode upon connection to another electronic device in an electronic device according to an embodiment of the present disclosure.

FIG. 8 is a process for switching to an activated mode upon connection to another electronic device in an electronic device according to an embodiment of the present disclosure.

Referring to FIG. 8, in step 801, the electronic device (for example, the electronic device 300 of FIG. 3) may operate in a deactivated mode. For example, the deactivated mode may include one or more of a screensaver mode, a power saving mode, and a locked mode.

In step 803, the electronic device may establish a communication link with another electronic device (for example, the electronic device 302 or 304, or the server 364) by using one or more of a wired link and a wireless link. For example, the electronic device (the electronic device 300 of FIG. 3) may establish a communication link with another electronic device by using an USB cable or a docking device. As another example, the electronic device may establish a communication link with another electronic device according to a short-range communication scheme.

When establishing the communication link with the other electronic device, the electronic device switches to an activated mode in step 805. For example, when establishing the communication link with the other electronic device, the electronic device may determine whether the other electronic device is authenticated. When the other electronic device is authenticated, the electronic device may recognize that the user is to use the electronic device according to the connection of the other electronic device and release a locked mode or perform a login process.

Figure 9:
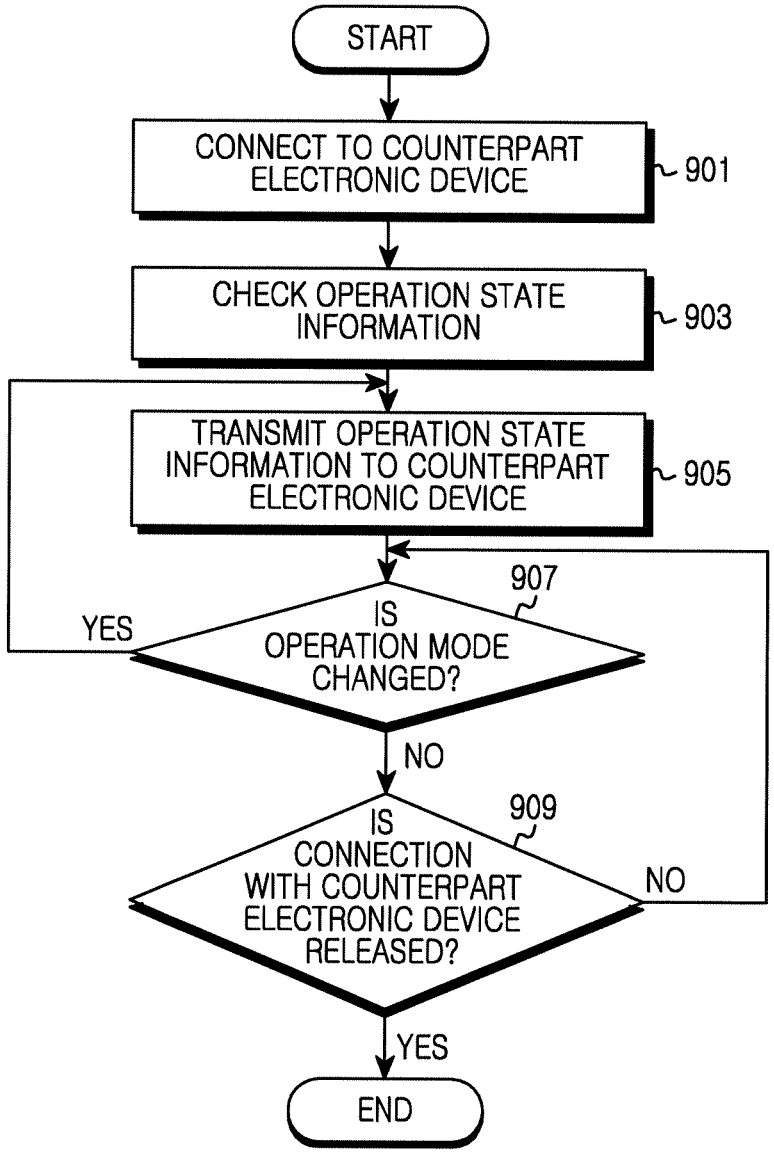
FIG. 9 illustrates a flowchart of a process for transmitting operation state information to another electronic device in an electronic device according to an embodiment of the present disclosure.

FIG. 9 illustrates a flowchart of a process for transmitting operation state information to another electronic device in an electronic device according to an embodiment of the present disclosure.

Referring to FIG. 9, in step 901, the electronic device (for example, the electronic device 300 of FIG. 3) may establish a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When establishing the communication link with the other electronic device, the electronic device checks operation state information of the electronic device in step 903. For example, when establishing the communication link with the other electronic device, the electronic device may determine whether the other electronic device is authenticated. When the other electronic device is authenticated, the electronic device checks operation state information that is to be transmitted to the other electronic device with which the communication link is established. For example, the operation state information may include one or more of activated state information of the electronic device, deactivated state information of the electronic device, and information associated with an application program that is executed in the electronic device.

When checking the operation state information of the electronic device, the electronic device may transmit the operation state information of the electronic device to the other electronic device in step 905.

Thereafter, the electronic device determines whether an operation mode of the electronic device is changed in step 907.

When the operation mode of the electronic device is changed, the electronic device may transmit changed operation state information of the electronic device to the other electronic device in step 905.

When it is determined that the operation mode is not changed in step 907, the electronic device may determine whether the connection with the other electronic device is released in step 909.

When the connection with the other electronic device is not released, the electronic device determines whether the operation mode of the electronic device is changed in step 907.

When it is determined that the connection with the other electronic device is released in step 909, the electronic device ends the algorithm.

Figure 10:
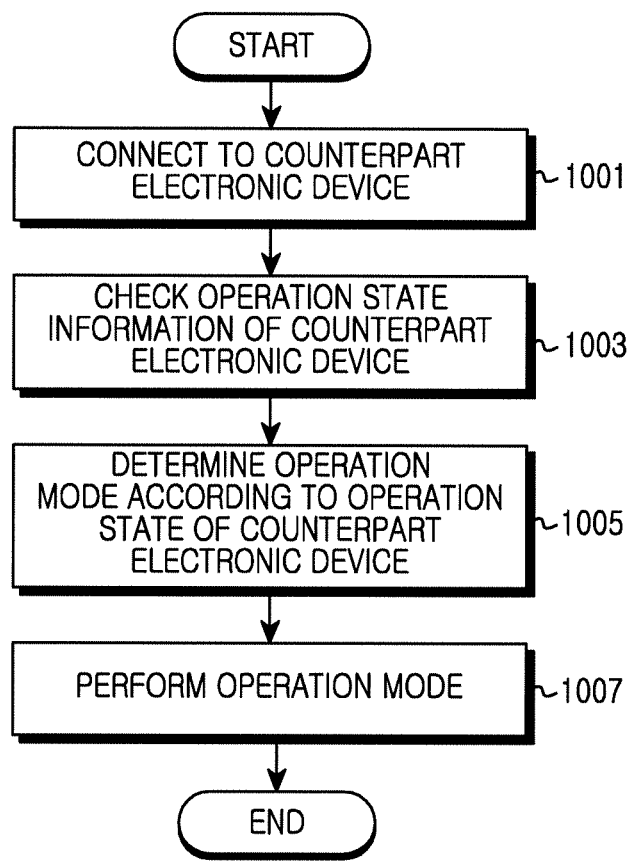
FIG. 10 illustrates a flowchart of a process for determining an operation mode based on operation state information provided from another electronic device in an electronic device according to an embodiment of the present disclosure.

FIG. 10 illustrates a flowchart of a process for determining an operation mode based on operation state information provided from another electronic device in an electronic device according to an embodiment of the present disclosure.

Referring to FIG. 10, in step 1001, the electronic device (for example, the electronic device 100 of FIG. 3) may establish a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device checks operation state information of the other electronic device with which the communication link is established in step S1003. For example, the electronic device may receive operation state information of the other electronic device from the other electronic device.

In step 1005, the electronic device may determine an operation mode of the electronic device based on the operation state information of the other electronic device with which the communication link is established. For example, when the other electronic device operates in a deactivated mode, the electronic device may determine a deactivated mode as the operation mode of the electronic device. For example, when the other electronic device operates in an activated mode, the electronic device may determine an activated mode as the operation mode of the electronic device. For example, the electronic device may determine an activated mode or a deactivated mode as an operation mode of the electronic device according to characteristics of an application program executed in the other electronic device.

When the operation mode of the electronic device is determined according to the operation state information of the other electronic device, the electronic device may perform the determined operation mode in step 1007. For example, the electronic device deactivates the display unit 350 of the electronic device according to characteristics of the application program that is executed in the other electronic device. For example, the electronic device may operate in a power saving mode according to the characteristics of the application program that is executed in the other electronic device. For example, the electronic device may switch the electronic device to a locked mode according to the characteristics of the application program that is executed in the other electronic device.

In the above-described embodiment, the electronic device switches between operation modes of the electronic device according to the operation mode of the electronic device determined according to the operation state information of the other electronic device. For example, when it is determined that the other electronic device connected to the electronic device is in an unlocked state, the electronic device may switch to an activated mode. When it is determined that the other electronic device connected to the electronic device is in a locked state (for example, a locked mode), the electronic device may operate in a deactivated mode.

In the above embodiment, the electronic device may transmit operation state information of the electronic device to another electronic device for interworking of operation modes with the other electronic device with which the communication link is established.

Figure 11:
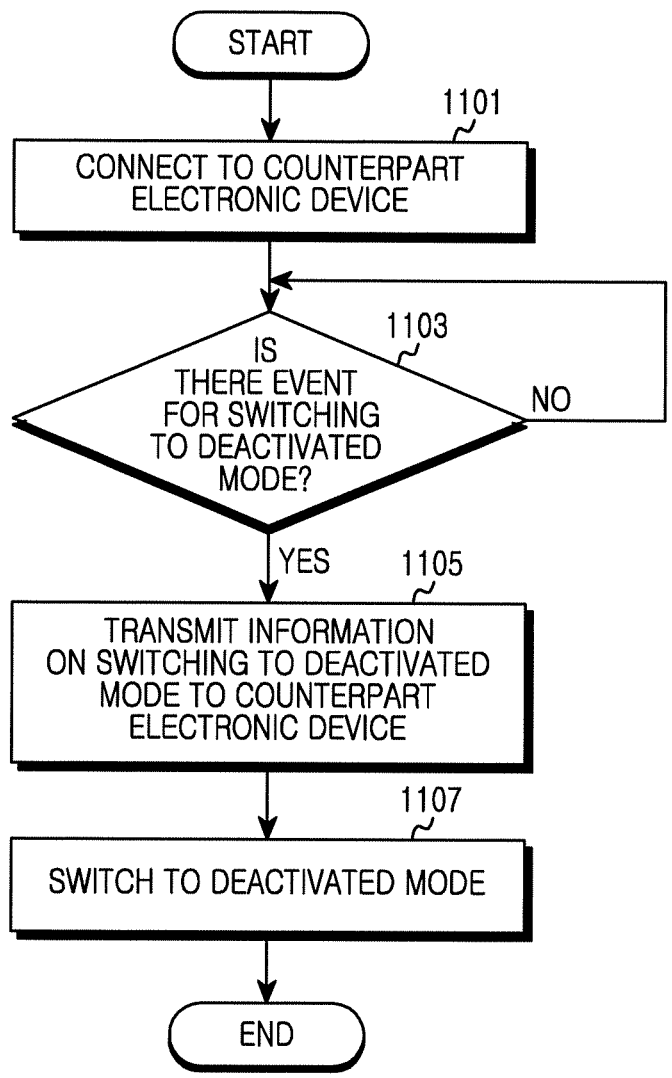
FIG. 11 illustrates a flowchart of a process for transmitting deactivated-mode switching information to another electronic device in an electronic device according to an embodiment of the present disclosure.

In another embodiment, the electronic device may determine an operation mode of the other electronic device according to operation state information of the electronic device and notify another electronic device of the determined operation mode for interworking of operation modes with the other electronic device with which the communication link is established. For example, when the electronic device operates in a deactivated mode, the electronic device may transmit a signal requesting a switching to a deactivated state to another electronic device as illustrated in FIG. 11. For example, when the other electronic device operates in an activated mode, the electronic device may transmit a signal requesting a switching to an activated state to the other electronic device. For example, the electronic device may determine an operation mode of the other electronic device according to characteristics of an application program executed in the electronic device and notify the other electronic device of the determined operation mode.

FIG. 11 illustrates a flowchart of a process for transmitting information on switching to a deactivated mode to another electronic device in an electronic device according to an embodiment of the present disclosure.

Referring to FIG. 11, in step 1101, the electronic device (for example, the electronic device 300 of FIG. 3) may establish a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When establishing the communication link with the other electronic device, the electronic device determines whether there is an event for switching to a deactivated mode in step 1103. For example, when the communication link is established with the other electronic device, the electronic device may determine whether the other electronic device is authenticated. When the other electronic device is authenticated, the electronic device may determine whether there is an event for switching to a deactivated mode. For example, occurrence or non-occurrence of the event for switching to a deactivated mode may be determined based on one or more of driving information of the electronic device and user input information.

When there is the event for switching to a deactivated mode, the electronic device may transmit information on switching to a deactivated mode to the other electronic device in step 1105.

Thereafter, the electronic device switches an operation mode of the electronic device to a deactivated mode in step 1107.

In the above-described embodiment, when there is the event for switching to a deactivated mode (step 1103), the electronic device transmits the information on switching to a deactivated mode to the other electronic device (step 1105) and switches to a deactivated mode (step 1107). The electronic device may perform the process of transmitting the information on switching to a deactivated mode to the other electronic device (step 1105) and the process of switching to the deactivated mode (step 1107) in parallel.

Figure 12:
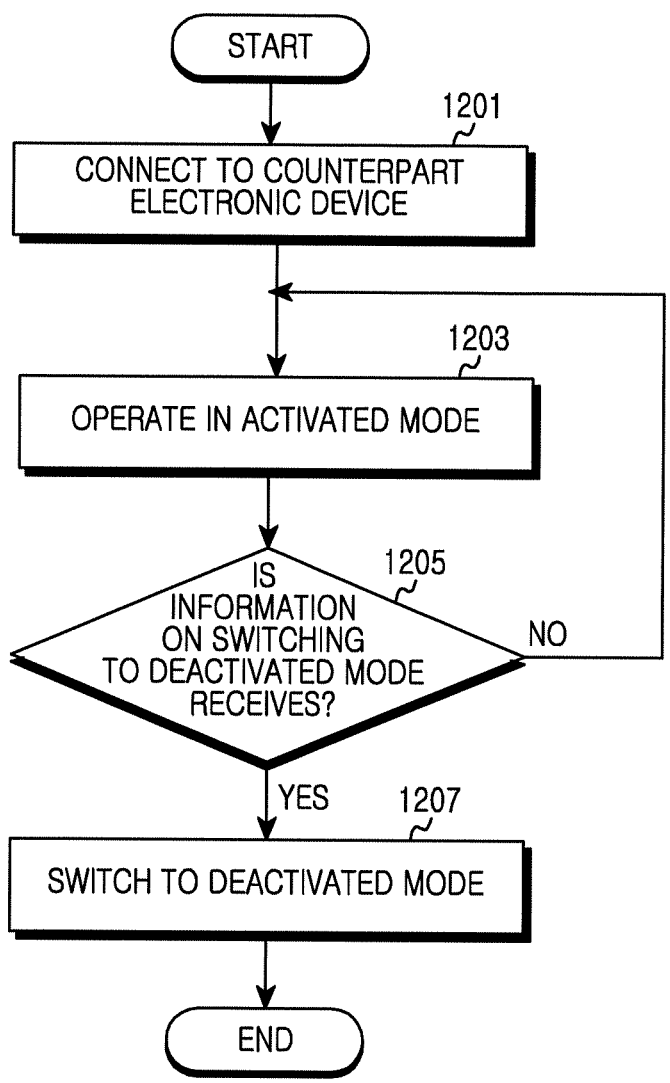
FIG. 12 illustrates a flowchart of a process for switching to a deactivated mode according to information on switching to a deactivated mode provided from another electronic device in an electronic device according to an embodiment of the present disclosure.

FIG. 12 illustrates a process for switching to a deactivated mode according to information on switching to a deactivated mode provided from another electronic device in an electronic device according to an embodiment of the present disclosure.

Referring to FIG. 12, in step S1201, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device may operate in an activated mode in step 1203. For example, when the communication link is established with the other electronic device, the electronic device may determine whether the other electronic device is authenticated. When the other electronic device is authenticated, the electronic device may recognize that the user is to use the electronic device according to the connection of the other electronic device, and release a locked mode or perform a login process.

In step 1205, the electronic device may determine whether information on switching to a deactivated mode is received from the other electronic device.

When the information on switching to a deactivated mode is not received from the other electronic device, the electronic device may operate in an activated mode in step 1203.

When it is determined that the information on switching to a deactivated mode is received from the other electronic device in step 1205, the electronic device may switch an operation mode of the electronic device to a deactivated mode in step 1207. For example, the electronic device may deactivate the display unit 250. As another example, the electronic device may operate in a power saving mode. As another example, the electronic device may operate in a locked mode.

Figure 13:
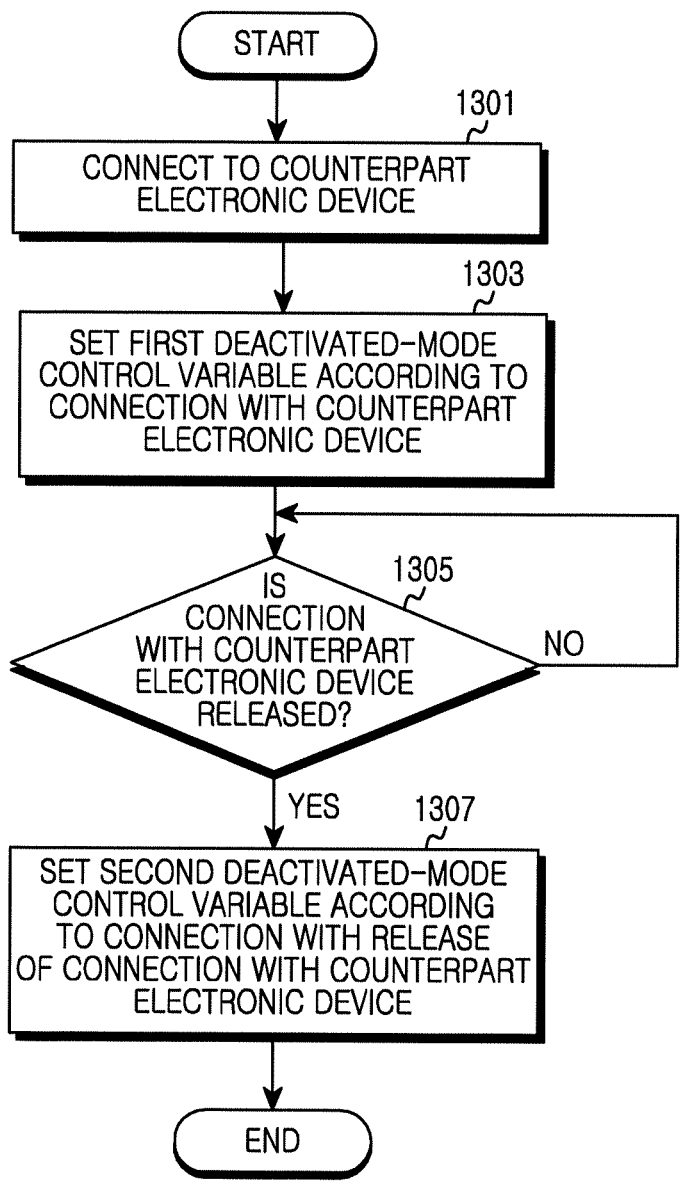
FIG. 13 illustrates a flowchart of a process for changing a deactivated-mode control variable depending on whether an electronic device is connected to another electronic device in an electronic device according to an embodiment of the present disclosure.

FIG. 13 illustrates a flowchart of a process for changing a deactivated-mode control variable depending on whether an electronic device is connected to another electronic device in an electronic device according to an embodiment of the present disclosure.

Referring to FIG. 13, in step 1301, the electronic device (for example, the electronic device 300 of FIG. 3) may establish a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device may set a deactivated mode by using a first deactivated-mode control variable according to the connection with the other electronic device in step 1303. For example, when establishing the communication link with the other electronic device, the electronic device may determine whether the other electronic device is authenticated. When the other electronic device is authenticated, the electronic device may set a deactivated mode by using the first deactivated-mode control variable. For example, the deactivated-mode control variable may include a time point at which a switching to the deactivated mode is performed.

In step 1305, the electronic device may determine whether the connection with the other electronic device is released.

When the connection with the other electronic device is released, the electronic device may set a deactivated mode by using a second deactivated-mode control variable according to the release of the connection with the other electronic device in step 1307.

As described above, the electronic device may set a deactivated mode of the electronic device differently by using the first deactivated-mode control variable or the second deactivated-mode control variable depending on whether the electronic device establishes the communication link with the other electronic device. For example, when the communication link is established with the other electronic device, the electronic device may recognize that a user is located adjacent to the electronic device in order to use the electronic device. Accordingly, the electronic device increases a time used for or required to switch to a deactivated mode by using the first deactivated-mode control variable, compared to a case where the communication link is not established with the other electronic device.

Figure 14:
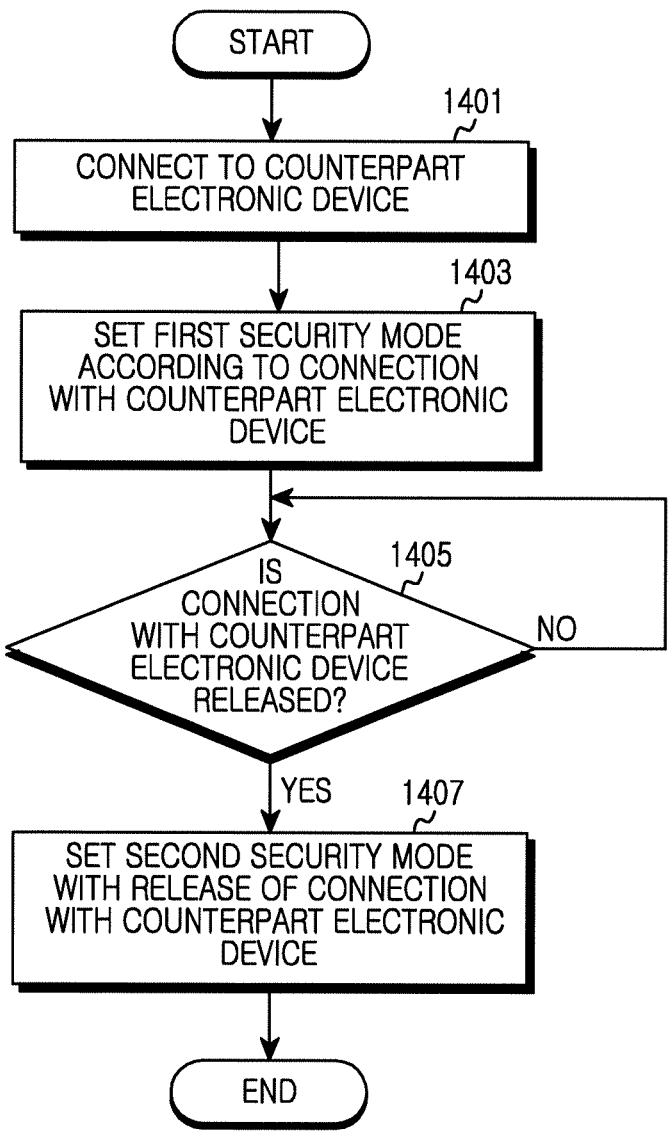
FIG. 14 illustrates a flowchart of a process for changing a security mode depending on whether an electronic device is connected to another electronic device in an electronic device according to an embodiment of the present disclosure.

FIG. 14 illustrates a flowchart of a process for changing a security mode depending on whether an electronic device is connected to another electronic device in an electronic device according to an embodiment of the present disclosure.

Referring to FIG. 14, in step S1401, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device may set a security mode of the electronic device to a first security mode according to the connection with the other electronic device in step 1403. For example, when the communication link is established with the other electronic device, the electronic device may determine whether the other electronic device is authenticated. When the other electronic device is authenticated, the electronic device may set a security mode of the electronic device to the first security mode. For example, the security mode may include one or more of an authentication method, the number of times of authentication, and identity data of the electronic device.

In step 1405, the electronic device may determine whether the connection with the other electronic device is released.

When the connection with the other electronic device is released, the electronic device may set a security mode of the electronic device to a second security mode according to the release of the connection with the other electronic device in step 1407. For example, the first security mode and the second security mode include different security information.

In the above-described embodiment, the electronic device may set a security mode differently depending on whether the electronic device is connected to the other electronic device. For example, the electronic device may perform setting to release a locked state by using first identity data when the electronic device is connected to the other electronic device, and perform setting to release a locked state by using second identity data when the electronic device is not connected to the other electronic device.

When a communication link is not established between a plurality of electronic devices, at least one of an authentication method, the number of times of authentication, and identity data may be set to be different between the electronic devices. When a communication link is not established between a plurality of electronic devices, at least one of an authentication method, the number of times of authentication, and identity data may be set to be the same between at least some of the plurality of electronic devices.

Figure 15:
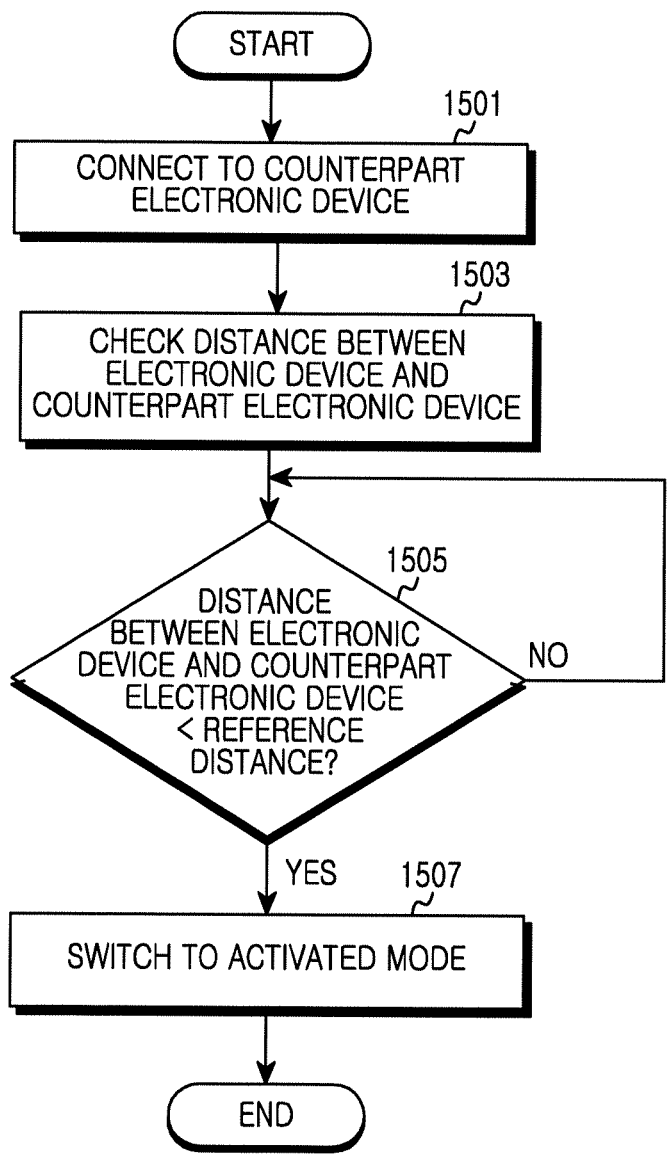
FIG. 15 illustrates a flowchart of a process for switching to an activated mode upon the connection to another electronic device in an electronic device according to an embodiment of the present disclosure.

FIG. 15 illustrates a flowchart of a process for switching to an activated mode upon the connection to another electronic device in an electronic device according to an embodiment of the present disclosure.

Referring to FIG. 15, in step 1501, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device checks a distance between the electronic device and the other electronic device in step 1503. For example, when the communication link is established with the other electronic device, the electronic device may determine whether the other electronic device is authenticated. When the other electronic device is authenticated, the electronic device may check the distance between the electronic device and the other electronic device. For example, the electronic device may request location information from the other electronic device and check the distance between the electronic device and the other electronic device. For example, the electronic device may recognize the distance between the two electronic devices based on the location information of the other electronic device and location information of the electronic device.

For example, the electronic device may check the distance between the electronic device and the other electronic device by using one or more sensors included in the electronic device. For example, the electronic device may use pedestrian dead reckoning (PDR) in order to check a relative location of the other electronic device with respect to the electronic device.

For example, the electronic device may check the distance between the electronic device and the other electronic device based on a signal strength associated with the other electronic device. For example, the electronic device may recognize the distance between the two electronic devices by comparing a strength value of a signal (for example, received signal strength indication (RSSI)) transmitted from the other electronic device with a preset reference value.

In step 1505, the electronic device may compare the distance between the two electronic devices with a reference distance to determine whether the other electronic device is located within the reference distance.

When the distance between the electronic device and the other electronic device is shorter than the reference distance, the electronic device may recognize the other electronic device as being located within the reference distance. Accordingly, the electronic device switches an operation mode of the electronic device to an activated mode in step 1507. For example, when the other electronic device with which the communication link is established is located within the reference distance, the electronic device may determine interworking of operation modes with the other electronic device. Therefore, the electronic device may release a locked mode of the electronic device or perform a login process.

As described above, when the other electronic device with which the communication link is established is located within the reference distance, the electronic device may release an authentication process for one or more of the electronic device and the other electronic device.

In the above-described embodiment, when the other electronic device with which the communication link is established is located within the reference distance, the electronic device may determine interworking of operation modes with the other electronic device and switch to an activated mode.

In another embodiment, when the other electronic device with which the communication link is established is located within the reference distance during a reference period of time, the electronic device may determine interworking of operation modes with the other electronic device and switch to an activated mode.

Figure 16:
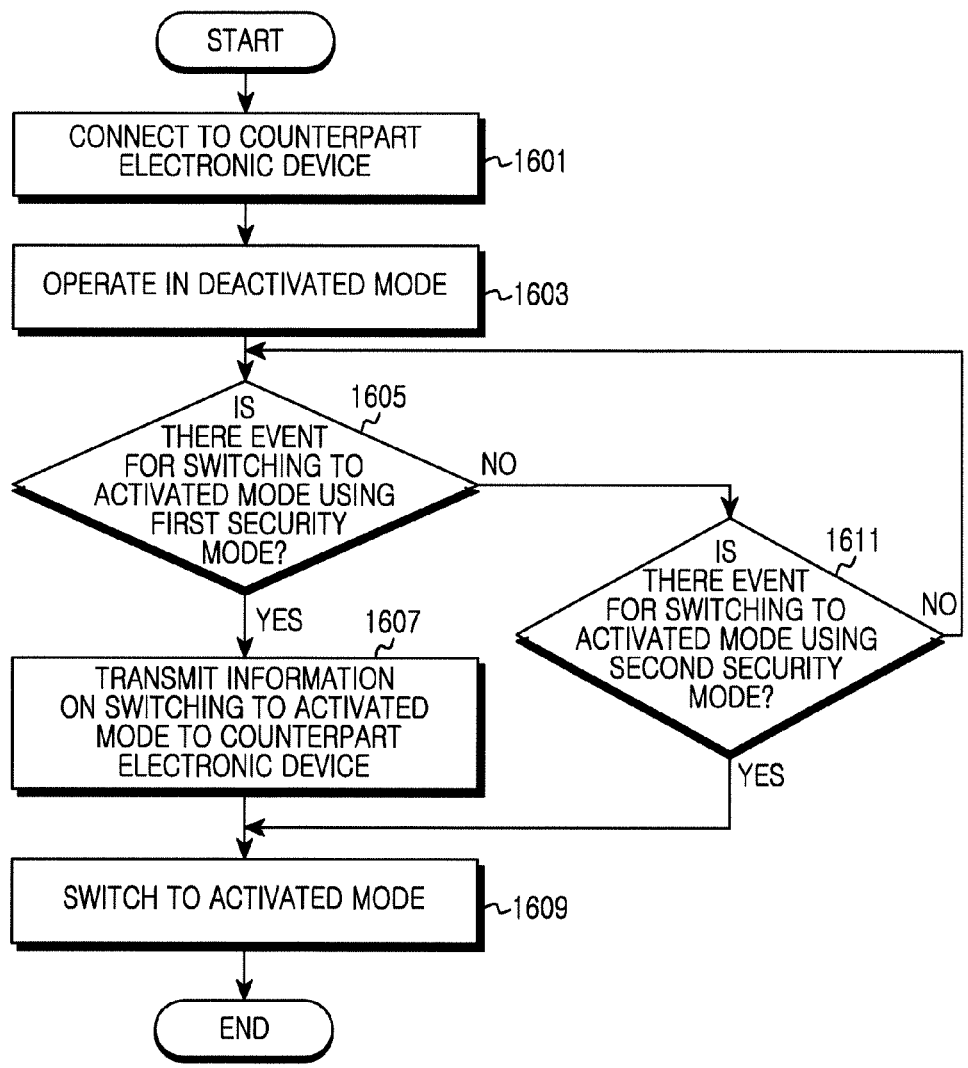
FIG. 16 illustrates a flowchart of a process for selectively performing interworking of operation modes with another electronic device in an electronic device according to an embodiment of the present disclosure.

FIG. 16 illustrates a flowchart of a process for selectively performing interworking of operation modes with another electronic device in an electronic device according to an embodiment of the present disclosure.

Referring to FIG. 16, in step 1601, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device may operate in a deactivated mode in step 1603. For example, when the electronic device does not detect a user input information through the other electronic device and the electronic device for a reference period of time, the electronic device may switch to a deactivated mode. For example, the electronic device may switch to a deactivated mode based on operation state information of the other electronic device. For example, the electronic device may switch to a deactivated mode according to the user input information.

In step 1605, the electronic device may determine whether there is an event for switching to an activated mode using a first security mode. For example, the electronic device may determine whether identity data corresponding to the first security mode is input. As another example, the electronic device may determine whether authentication information for an authentication method corresponding to the first security mode is input.

When there is an event for switching to an activated mode using the first security mode, the electronic device may determine interworking of operation modes with the other electronic device with which the communication link is established. Therefore, the electronic device may transmit activated mode switching information to the other electronic device in step 1607.

Thereafter, the electronic device switches an operation mode of the electronic device to an activated mode in step 1609. For example, the electronic device may release a locked mode of the electronic device or perform a login process.

When it is determined that there is no event for switching to an activated mode using the first security mode in step 1605, the electronic device determines whether there is an event for switching to an activated mode using the second security mode in step 1611. For example, the electronic device may determine whether identity data corresponding to the second security mode is input. As another example, the electronic device may determine whether authentication information for an authentication method corresponding to the second security mode is input.

When there is an event for switching to an activated mode using the second security mode, the electronic device may determine that there is no interworking of operation modes with the other electronic device with which the communication link is established. Accordingly, the electronic device switches an operation mode of the electronic device to an activated mode in step 1609. For example, the electronic device may switch an operation mode the electronic device to an activated mode without transmitting activated mode switching information to the other electronic device. For example, the electronic device may release a locked mode of the electronic device or perform a login process.

In the above-described embodiment, when there is an event for switching to an activated mode, which corresponds to the first security mode, the electronic device may transmit activated mode switching information to the other electronic device with which the communication link is established. For example, when a communication link is established between a plurality of electronic devices, the plurality of electronic devices may share identity data for releasing a locked state (for example, at least one of a password, a lock pattern, an object from which biometric information is recognized) in at least some electronic devices of the plurality of electronic devices. When at least one electronic device of the plurality of electronic devices between which a communication link is established recognizes identity data for releasing a locked state in at least some electronic devices, the at least one electronic device that recognizes the identity data may perform control so as to release the locked state of the at least some electronic devices.

As described above, the electronic device may selectively perform interworking of operation modes with the other electronic device with which the communication link is established, according to a security mode for switching to an activated state.

Figure 17:
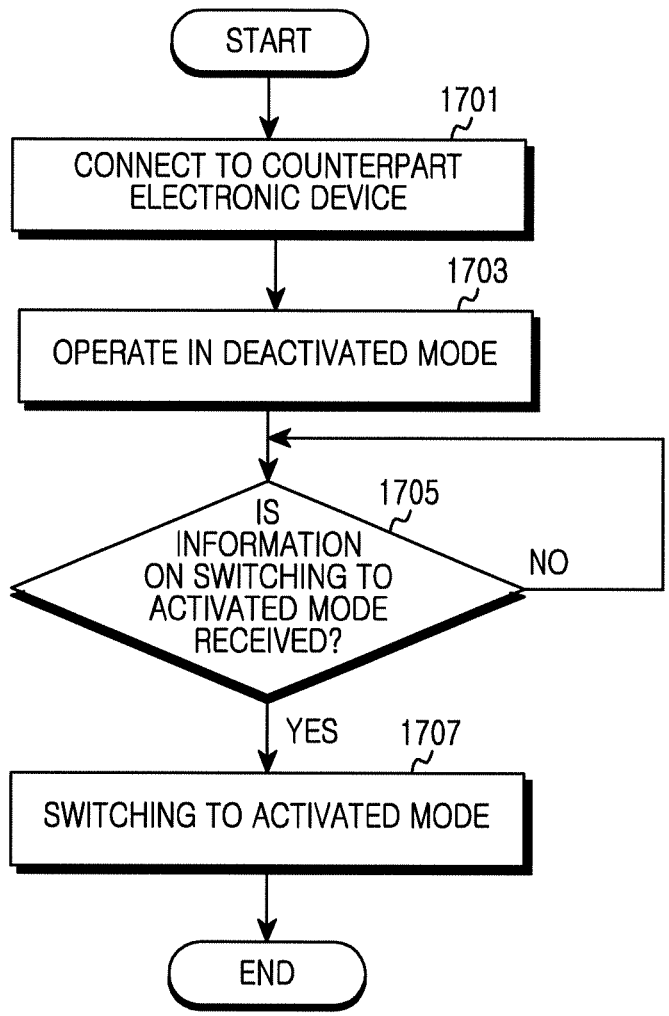
FIG. 17 illustrates a flowchart of a process for switching to an activated mode according to an activated mode switching information provided from another electronic device in an electronic device according to an embodiment of the present disclosure.

FIG. 17 illustrates a flowchart of a process for switching to an activated mode according to an activated mode switching information provided from another electronic device in an electronic device according to an embodiment of the present disclosure.

Referring to FIG. 17, in step 1701, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device may operate in a deactivated mode in step 1703. For example, when the electronic device does not detect user input information through the other electronic device and the electronic device for a reference period of time, the electronic device may switch to a deactivated mode. For example, the electronic device may switch to a deactivated mode based on operation state information of the other electronic device. As another example, the electronic device may switch to a deactivated mode according to the user input information.

In step 1705, the electronic device may determine whether activated mode switching information is received from the other electronic device with which the communication link is established. For example, the other electronic device may transmit the activated mode switching information in the case of determining interworking of operation modes with the electronic device according to the security mode for switching to an activated state as illustrated in FIG. 16. Therefore, the electronic device may determine whether activated mode switching information is received from the other electronic device with which the communication link is established.

When the activated mode switching information is not received from the other electronic device, the electronic device operates in a deactivated mode in step 1703.

When it is determined that the activated mode switching information is received from the other electronic device in step 1705, the electronic device switches an operation mode of the electronic device to an activated mode in step 1707. For example, the electronic device may release a locked mode of the electronic device or perform a login process.

Figure 18:
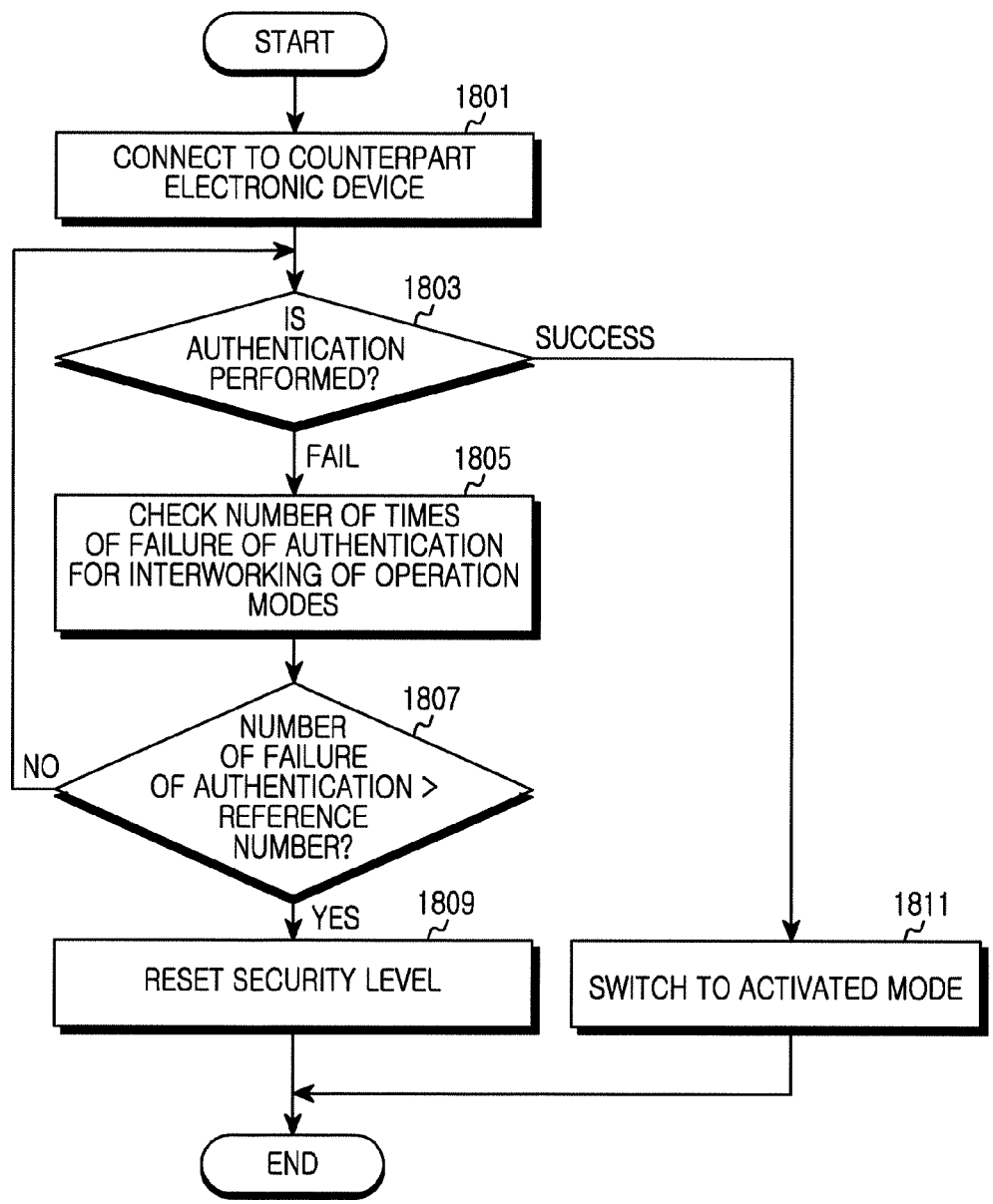
FIG. 18 illustrates a flowchart of a process for sharing security state information with another electronic device in an electronic device according to an embodiment of the present disclosure.

FIG. 18 illustrates a flowchart of a process for sharing security state information with another electronic device in an electronic device according to an embodiment of the present disclosure.

Referring to FIG. 18, in step 1801, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

In step 1803, the electronic device may perform authentication (for example, user authentication) according to input information provided through the input unit 340.

When the authentication is successful according to the input information provided through the input unit 340, the electronic device may switch an operation mode of the electronic device to an activated mode in step 1811. For example, the electronic device may release a locked mode of the electronic device or perform a login process.

When the authentication fails according to the input information provided through the input unit 340, the electronic device may check the number of times of failure of authentication for interworking of operation modes in step 1805. For example, the electronic device may check the number of times of failure of authentication for a reference period of time in the electronic device and the number of times of failure of authentication for the reference period of time in the other electronic device with which the communication link is established.

In step 1807, the electronic device may determine whether the number of times of failure of authentication for interworking of operation modes is greater than a reference number.

When the number of times of failure of authentication for interworking of operation modes is equal to or less than the reference number, the electronic device may again perform authentication according to input information again provided through the input unit 340 in step 1803.

When it is determined that the number of times of failure of authentication for interworking of operation modes is greater than the reference number in step 1807, the electronic device may reset a security level of at least one of the electronic device and the other electronic device in step 1809. For example, the electronic device may set a security level to increase. For example, the electronic device may perform user authentication.

In addition, when it is determined that the number of times of failure of authentication for interworking of operation modes is greater than the reference number in step 1807, the electronic device may recognize that there is the number of times of failure of authentication for which is the same as that in the electronic device, and request the other electronic device to perform an operation according to failure of authentication for interworking for operation modes. For example, in the case of setting the security level of the electronic device to increase, the electronic device may request a security level of the other electronic device to be adjusted to increase.

Figure 19:
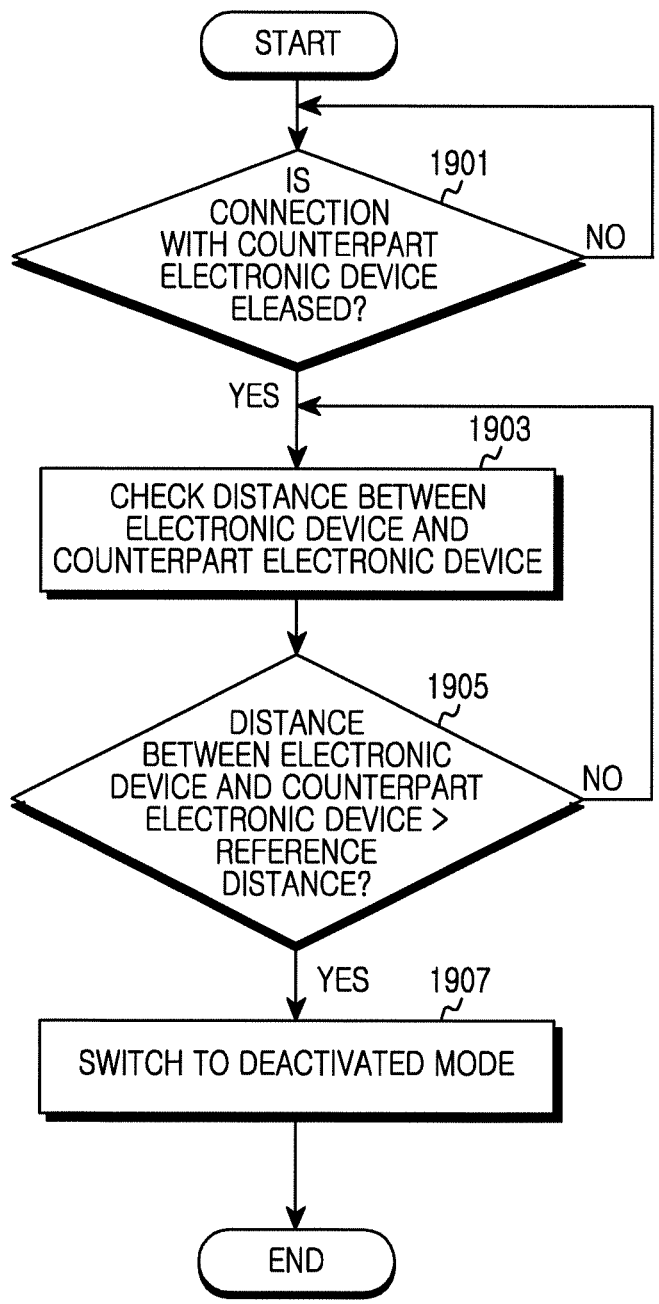
FIG. 19 illustrates a flowchart of a process for switching to a deactivated mode upon the release of connection with another electronic device in an electronic device according to an embodiment of the present disclosure.

FIG. 19 illustrates a flowchart of a process for switching to a deactivated mode upon the release of connection with another electronic device in an electronic device according to an embodiment of the present disclosure.

Referring to FIG. 19, in step S1901, the electronic device (for example, the electronic device 300 of FIG. 3) may determine whether a wired link connection with another electronic device (for example, the electronic device 302 or 304, or the server 364 in FIG. 3) with which a communication link has been established and with which interworking of operation modes is performed.

When the wired link connection with the other electronic device is released, the electronic device may acquire a distance between the electronic device and the other electronic device by using a wireless link with the other electronic device in step 1903. For example, when electronic device is connected to another electronic device through a wired link or a wireless link and performs interworking of operation modes with the other electronic device, the electronic device may check a distance between the electronic device and the other electronic device by using the wireless link with the other electronic device upon the release of the wired link with the other electronic device. For example, when the wired link connection with the other electronic device is released, the electronic device may acquire a distance between the electronic device and the other electronic device by using the wireless link with the other electronic device. For example, the electronic device may request location information from the other electronic device and check the distance between the electronic device and the other electronic device. For example, the electronic device may check the distance between the electronic device and the other electronic device by using one or more sensors included in the electronic device. For example, the electronic device may check the distance between the electronic device and the other electronic device based on a signal strength associated with the other electronic device.

In step 1905, the electronic device may compare the distance between the two electronic devices with a reference distance to determine whether the other electronic device moves outside the reference distance.

When the distance between the electronic device and the other electronic device is equal to or shorter than the reference distance, the electronic device may determine that the other electronic device is located within the reference distance and a communication link is capable of being established. Accordingly, in step 1903, the electronic device may check the distance between the electronic device and the other electronic device.

When it is determined that the distance between the electronic device and the other electronic device is equal to or shorter than the reference distance, the electronic device may determine that the other electronic device moves outside the reference distance and a communication link is not to be established in future. Accordingly, the electronic device switches an operation mode of the electronic device to a deactivated mode in step 1907.

Figure 20:
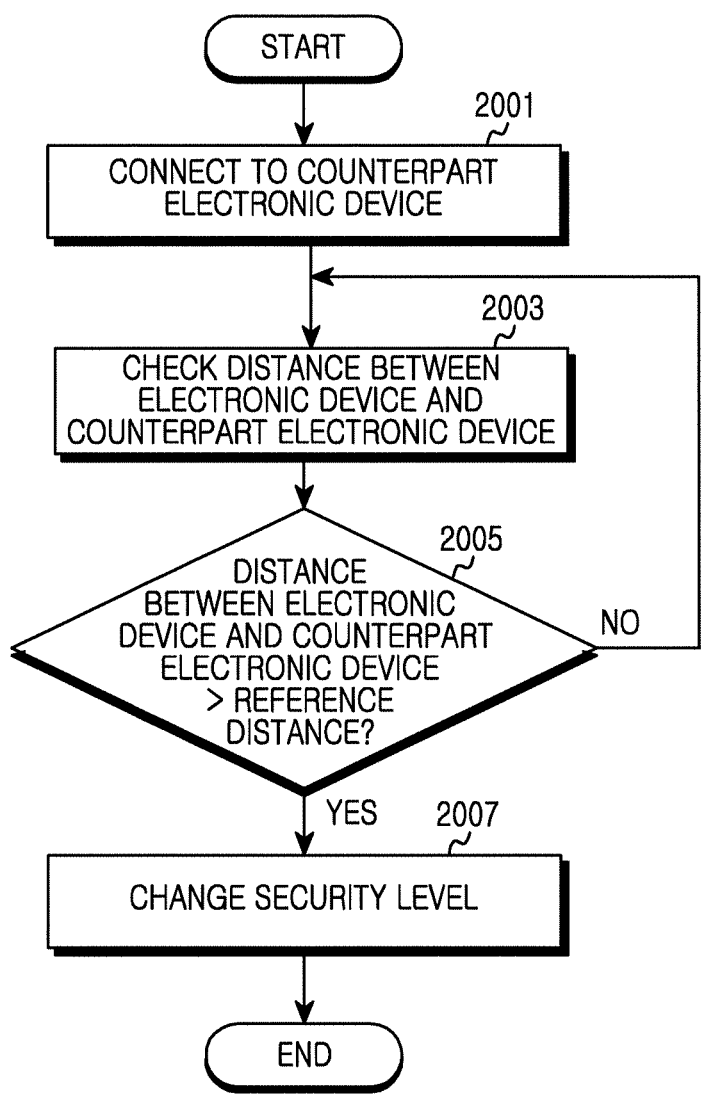
FIG. 20 illustrates a flowchart of a process for changing a security level according to a distance between an electronic device and another electronic device in an electronic device according to an embodiment of the present disclosure.

FIG. 20 illustrates a flowchart of a process for changing a security level according to a distance between an electronic device and another electronic device in an electronic device according to an embodiment of the present disclosure.

Referring to FIG. 20, in step 2001, the electronic device (for example, the electronic device 300 of FIG. 3) establishes a communication link with another electronic device (for example, the electronic device 302 or 304, or the server 364 in FIG. 3) by using at least one of a wired link and a wireless link. For example, the electronic device may establish a communication link with another electronic device by using an USB cable or a docking device. As another example, the electronic device may establish a communication link with another electronic device according to a short-range communication scheme.

When the communication link is established with the other electronic device, the electronic device checks a distance between the electronic device and the other electronic device in step 2003. For example, when the communication link is established with the other electronic device, the electronic device may determine whether the other electronic device is authenticated. When the other electronic device is authenticated, the electronic device may perform interworking of operation modes with the other electronic device. The electronic device may check the distance between the electronic device and the other electronic device during interworking of operation modes with the other electronic device. For example, the electronic device may request location information from the other electronic device and check the distance between the electronic device and the other electronic device.

For example, the electronic device may check the distance between the electronic device and the other electronic device by using one or more sensors included in the electronic device. For example, when at least one of a plurality of electronic device located within a reference range moves, the moving electronic device may determine a relative location with respect to a location at which the electronic device has been located before movement by using one or more of an acceleration sensor, a gyro sensor, and a geomagnetic sensor included in the electronic device. For example, the electronic device may use pedestrian dead reckoning (PDR) in order to determine a relative location of the other electronic device with respect to the electronic device.

For example, the electronic device may check the distance between the electronic device and the other electronic device based on a signal strength associated with the other electronic device.

In step 2005, the electronic device may compare the distance between the two electronic devices with a reference distance to determine whether the other electronic device is located within the reference distance.

When the distance between the electronic device and the other electronic device is equal to or shorter than the reference distance, the electronic device may determine that the other electronic device is located within the reference distance and maintains a security level thereof. Accordingly, in step 2003, the electronic device may check the distance between the electronic device and the other electronic device.

When it is determined that the distance between the electronic device and the other electronic device is equal to or shorter than the reference distance, the electronic device may determine that the other electronic device moves outside the reference distance and there is a need to change a security level thereof. Accordingly, in step 2007, the electronic device may change the security level of the electronic device. For example, when a counterpart electronic device with which a communication link is established and interworking of operation modes is performed is spaced apart from the electronic device by more than a reference distance, the electronic device may prevent a payment-related application program from being executed in at least one of the electronic device and the other electronic device. As another example, the electronic device may switch an operation mode of at least one of the electronic device and the other electronic device to a deactivated mode. For example, when the distance between the electronic device and the other electronic device is longer than a reference distance, the electronic device may perform control such that at least one electronic device of the electronic device and the other electronic device performs at least one of a screensaver function, a power saving function, and a lock function.

In the above-described embodiment, the electronic device may change a security level based on a distance between the electronic device and another electronic device with which interworking of operation modes is performed. For example, when another electronic device is a wearable electronic device, the electronic device may selectively change a security level based on a distance between the electronic device and the other electronic device depending on whether a user wears the other electronic device. For example, the electronic device may determine whether a wearable electronic device is worn by a user based on sensor information of the wearable electronic device with which interworking of operation modes is performed. For example, when the wearable electronic device is worn by the user, the electronic device may change a security level based on the distance between the electronic device and the wearable electronic device.

According to the embodiments of the present disclosure, a plurality of electronic devices, connected to one another through wired communication and wireless communication, share information associated with operations of the electronic devices with one another, thereby improving user convenience for the plurality of electronic devices.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating a first electronic device, the method comprising:
    establishing wired communication with a second electronic device;
    receiving state information from the second electronic device via the established wired connection;
    identifying an operation mode of the second electronic device based on the received state information; and
    unlocking the first electronic device when the identified operation mode of second electronic device comprises an unlocked mode;
    determining whether the wired communication with the second electronic device is released;
    determining whether to switch to a locked mode based on information related to a distance between the first electronic device and the second electronic device after the wired communication with the second electronic device is determined to be released; and
    switching to the locked mode according to the determining of whether to switch.

2. The method of claim 1, wherein identifiable operation modes of the second electronic device further include one or more of a screensaver mode, a power saving mode, a locked mode, a standby mode, and an activated mode.

3. The method of claim 1, wherein the first electronic device comprises a laptop computer.

4. The method of claim 1, wherein the second electronic device comprises a mobile phone.

5. The method of claim 1, further comprising, when an operation mode of the first electronic device is changed, providing state information of the first electronic device to the second electronic device.

6. The method of claim 1, wherein the first electronic device switches to the locked mode based on determining that the distance between the first electronic device and the second electronic device is greater than a reference distance.

7. The method of claim 1, further comprising receiving, by the first electronic device, information about an application program currently executing on the second electronic device via the established wired communication.

8. A first electronic device comprising:
    a communication unit;
    a sensor; and
    a processor configured to at least:
        establish wired communication with a second electronic device;
        receive state information from the second electronic device through the communication unit;
        identify an operation mode of the second electronic device based on the received state information;
        unlock the first electronic device when the identified operation mode of second electronic device comprises an unlocked mode;
        determine whether the wired communication with the second electronic device is released;
        determine whether to switch to a locked mode based on information related to a distance between the first electronic device and the second electronic device after the wired communication with the second electronic device is determined to be released; and
        switch to the locked mode according to the determining of whether to switch.

9. The first electronic device of claim 8, wherein identifiable operation modes of the second electronic device further include at least one of a screensaver mode, a power saving mode, a locked mode, a standby mode, and an activated mode.

10. The first electronic device of claim 8, wherein the first electronic device comprises a laptop computer.

11. The first electronic device of claim 8, wherein the second electronic device comprises a mobile phone.

12. The first electronic device of claim 8, wherein the processor is configured to, when an operation mode of the first electronic device is changed, transmit state information of the first electronic device to the second electronic device.

13. The first electronic device of claim 8, wherein the processor is configured to switch the first electronic device to the locked mode based on determining that the distance between the first electronic device and the second electronic device is greater than a reference distance.

14. The first electronic device of claim 8, wherein the first electronic device receives information about an application program currently executing on the second electronic device via the established wired communication.

* * * * *